US012781568B2

(12) United States Patent
Chambers et al.

(10) Patent No.: US 12,781,568 B2
(45) Date of Patent: Nov. 3, 2026

(54) RETENTION SYSTEMS FOR WINDOW TREATMENT INSTALLATIONS

(71) Applicant: Lutron Technology Company LLC, Coopersburg, PA (US)

(72) Inventors: Samuel F. Chambers, Gwynedd Valley, PA (US); David A. Kirby, Zionsville, PA (US); Peter W. Ogden, Breinigsville, PA (US); James J. Wilson, Nazareth, PA (US); Andrew P. Schmalz, Macungie, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 507 days.

(21) Appl. No.: 18/309,937

(22) Filed: May 1, 2023

(65) Prior Publication Data

US 2023/0304356 A1 Sep. 28, 2023

Related U.S. Application Data

(63) Continuation of application No. 16/566,353, filed on Sep. 10, 2019, now Pat. No. 11,674,351, which is a (Continued)

(51) Int. Cl.
*E06B 9/42* (2006.01)
*E06B 9/50* (2006.01)
(Continued)

(52) U.S. Cl.
CPC .................. *E06B 9/42* (2013.01); *E06B 9/50* (2013.01); *E04F 10/0677* (2013.01); *E06B 9/80* (2013.01)

(58) Field of Classification Search
CPC ...... E06B 9/42; E06B 9/50; E06B 9/80; E04F 10/0677
See application file for complete search history.

(56) References Cited

U.S. PATENT DOCUMENTS 477,512 A 6/1892 Combis
743,711 A * 11/1903 Gaylord .............. E04F 10/0648 242/395
(Continued)

FOREIGN PATENT DOCUMENTS

DE 4436504 C1 11/1995

*Primary Examiner* — Abe Massad
(74) *Attorney, Agent, or Firm* — Michael S. Czarnecki; Glen R. Farbanish; Philip N. Smith

(57) ABSTRACT

A window treatment retention system may include a roller shade assembly and one or more retention brackets that at least partially enclose the roller shade assembly and do not interfere with operation of the roller shade assembly. The retention brackets may be configured to absorb an impact force associated with detachment of the roller shade assembly from a mounted position. The retention brackets may deflect upon absorbing the impact force, and may limit displacement of the detached roller shade assembly from the mounted position. The retention brackets may deflect such that the roller shade assembly does not pass through openings defined by the retention brackets. The retention brackets may deflect such that the width of at least one of the openings defined by the retention brackets does not expand beyond a distance that is equivalent to the diameter of a roller tube of the roller shade assembly.

14 Claims, 19 Drawing Sheets

Related U.S. Application Data continuation of application No. 14/749,618, filed on Jun. 24, 2015, now Pat. No. 10,407,982.

(60) Provisional application No. 62/016,335, filed on Jun. 24, 2014.

(51) Int. Cl.

| | |
|---|---|
| *E04F 10/06* | (2006.01) |
| *E06B 9/80* | (2006.01) |

(56) References Cited

U.S. PATENT DOCUMENTS

| | | | | | |
|---|---|---|---|---|---|
| 922,501 | A * | 5/1909 | Nodland | B65H 16/08 | 242/595.1 |
| 1,236,768 | A | 8/1917 | Sarmiento | | |
| 1,358,958 | A * | 11/1920 | Johnson | E04F 10/0677 | 242/595.1 |
| 1,363,321 | A * | 12/1920 | Jaeger | E04F 10/0662 | 242/918 |
| 1,377,784 | A * | 5/1921 | Nodland | E04F 10/0677 | 242/615 |
| 1,615,830 | A * | 2/1927 | Derus | E04F 10/0677 | 242/918 |
| 1,742,549 | A | 1/1930 | Macarthur et al. | | |
| 1,812,416 | A * | 6/1931 | Smith | E04F 10/0677 | 242/918 |
| 1,828,332 | A * | 10/1931 | McCandliss | E04F 10/0677 | 242/590 |
| 1,882,623 | A | 10/1932 | Joseph | | |
| 2,248,414 | A | 7/1941 | Schane | | |
| 2,894,578 | A | 7/1959 | Caesar et al. | | |
| 3,126,049 | A | 3/1964 | Hollands | | |
| 3,421,568 | A | 1/1969 | Youngs | | |
| 3,900,063 | A | 8/1975 | Roller | | |
| 4,159,162 | A | 6/1979 | Christoffel | | |
| 5,070,925 | A | 12/1991 | Paule | | |
| 5,365,989 | A * | 11/1994 | Eger | E04F 10/0618 | 160/22 |
| 5,474,117 | A | 12/1995 | Henkenjohann | | |
| 5,481,943 | A | 1/1996 | Kraeutler | | |
| 5,613,539 | A | 3/1997 | Kraler | | |
| 6,336,616 | B1 | 1/2002 | Lin | | |
| 6,695,033 | B1 | 2/2004 | Simon | | |
| 6,796,356 | B2 | 9/2004 | Kirby | | |
| 6,873,461 | B1 | 3/2005 | McPherson, Jr. | | |
| 6,902,141 | B2 | 6/2005 | Kirby | | |
| 6,983,783 | B2 | 1/2006 | Carmen, Jr. et al. | | |
| 7,823,620 | B2 | 11/2010 | Kirby | | |
| 7,839,109 | B2 | 11/2010 | Carmen, Jr. et al. | | |
| 7,995,274 | B1 | 8/2011 | Cheou et al. | | |
| 8,789,576 | B2 | 7/2014 | Krueger et al. | | |
| 9,115,537 | B2 | 8/2015 | Blair | | |
| 2010/0219306 | A1 | 9/2010 | Detmer et al. | | |
| 2012/0261078 | A1 | 10/2012 | Adams et al. | | |
| 2013/0153162 | A1 | 6/2013 | Blair et al. | | |
| 2013/0312920 | A1 * | 11/2013 | Mullet | E06B 9/72 | 160/310 |
| 2015/0059993 | A1 | 3/2015 | Wilson | | |
| 2017/0234061 | A1 | 8/2017 | Janick et al. | | |
| 2018/0195342 | A1 | 7/2018 | Geiger | | |
| 2018/0347274 | A1 | 12/2018 | Berman et al. | | |

* cited by examiner

RETENTION SYSTEMS FOR WINDOW TREATMENT INSTALLATIONS

CROSS-REFERENCE TO RELATED APPLICATIONS

This application is a continuation of U.S. patent application Ser. No. 16/566,353, filed Sep. 10, 2019; which is a continuation of U.S. patent application Ser. No. 14/749,618, filed on Jun. 24, 2015, now U.S. Pat. No. 10,407,982, issued on Sep. 10, 2019, which claims priority to U.S. Patent Application No. 62/016,335, filed Jun. 24, 2014, each of which is incorporated herein by reference in its entirety.

BACKGROUND

A window treatment may be mounted in front of an opening, such as a window, for example, to prevent sunlight from entering a space and/or to provide privacy. Window treatments may include, for example: roller shades, roman shades, venetian blinds, or draperies. A roller shade typically includes a flexible shade fabric wound onto an elongated roller tube.

A window treatment may be motorized. For example, a motorized roller shade may include a motor drive unit that is coupled to the roller tube to provide for tube rotation. When operated, the motor drive unit may cause the roller tube to rotate, such that the shade fabric is raised or lowered along a vertical direction, for example.

Motorized window treatments are often installed in residential applications. For example, motorized roller shades may be installed in front of one or more windows in a home. However, motorized window treatments may also be installed in larger scale applications. For example, large scale motorized roller shades may be installed in commercial spaces.

FIG. 1 depicts an example of a prior art overhead installation of a motorized window treatment 100 (e.g., a motorized roller shade) in an interior space of a commercial building, for instance a lobby or an atrium space. The motorized window treatment 100 includes a roller shade assembly 102. The roller shade assembly 102 includes a covering material (e.g., a shade fabric 104) that may be raised and lowered to cover an opening (e.g., windows 106), for example. The roller shade assembly 102 further includes a roller tube (not shown), to which an upper end of the shade fabric 104 is attached. The roller tube may be driven by an electric motor drive unit (not shown) to raise and lower the shade fabric 104. The roller shade assembly 102 further includes a hembar 108 that is attached to a lower end of the shade fabric 104. The hembar 108 may be weighted, such that the hembar 108 causes the shade fabric 104 to hang (e.g., vertically) in front of the windows 106.

In an overhead installation, a motorized roller shade may be attached to one or more structural elements of a building, such as an I-beam or other structural element. As shown, the roller shade assembly 102 is supported by opposed end brackets 110 that are attached to the ceiling or wall of the building, such that the motorized window treatment 100 is attached to the ceiling or wall of the building in a mounted position.

If the roller shade assembly 102 becomes inadvertently detached from the mounted position, the roller shade assembly 102 may fall. It is thus desirable to ensure that, if the roller shade assembly becomes inadvertently detached from its mounted position, the roller shade assembly is prevented from falling in an uncontrolled manner.

SUMMARY

As described herein, a motorized window treatment retention system (e.g., a roller shade retention system) may include a roller shade assembly and one or more retention brackets that at least partially enclose the roller shade assembly when the roller shade assembly is in a mounted position.

The retention brackets may be configured not to interfere with operation of the roller shade assembly. For example, the retention brackets may define respective openings that are sized to allow raising and lowering of a shade material of the roller shade assembly.

The retention brackets may be configured to absorb corresponding portions of an impact force associated with detachment of the roller shade assembly from the mounted position. The one or more retention brackets may be configured to remain rigid upon absorbing the corresponding portions of the impact force, or may be configured to deflect upon absorbing the corresponding portions of the impact force. The one or more retention brackets may further be configured to limit displacement of the detached roller shade assembly from the mounted position.

The retention brackets may be configured to deflect during absorption of the corresponding portions of the impact force such that the roller shade assembly does not pass through the openings defined by the retention brackets. The retention brackets may be configured to deflect during absorption of the corresponding portions of the impact force such that the width of at least one of the openings defined by the retention brackets does not expand beyond a distance that is equivalent to the diameter of the roller tube of the roller shade assembly.

DETAILED DESCRIPTION

Figure 1:
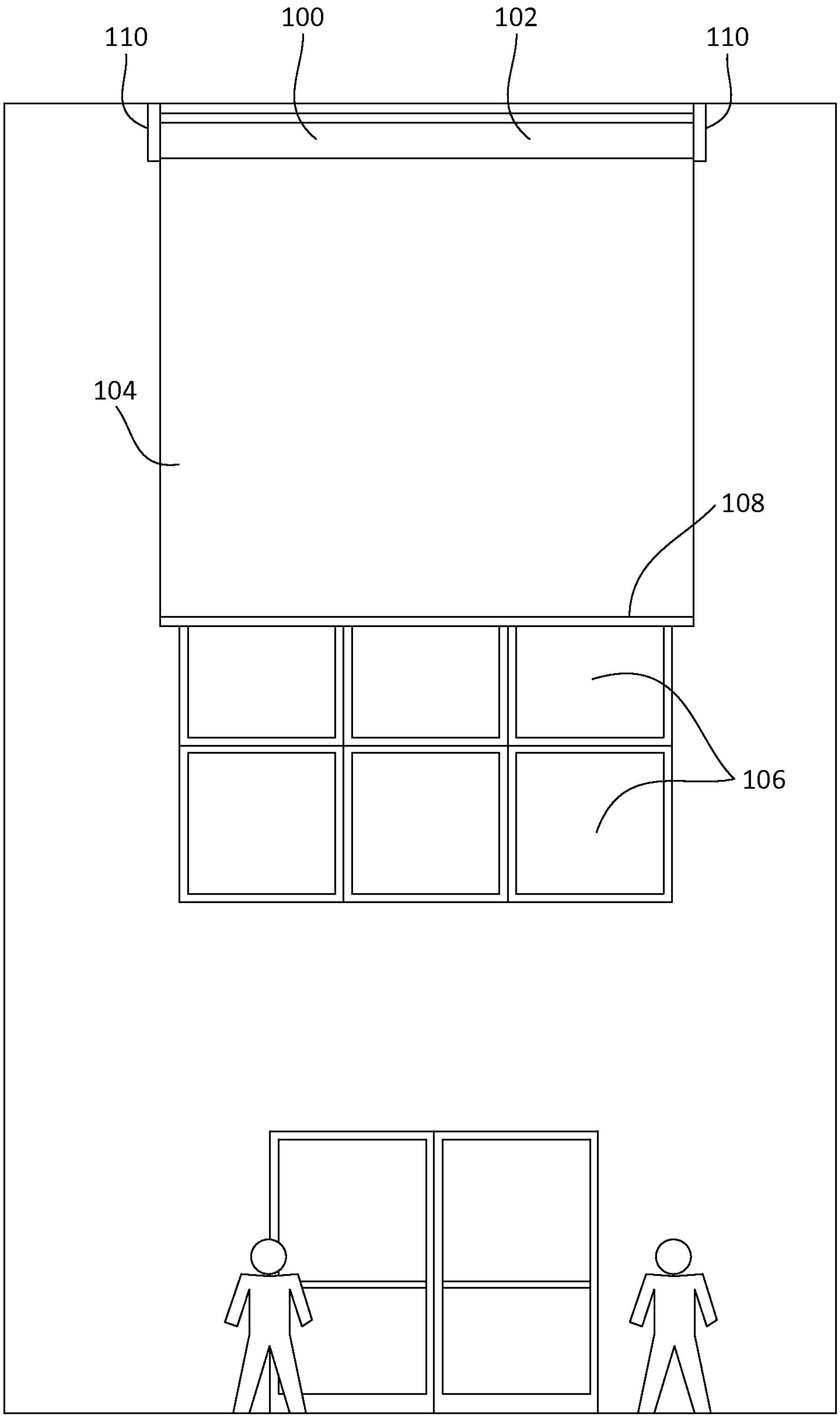
FIG. 1 (PRIOR ART)
FIG. 1 depicts an example prior art overhead installation of a roller shade assembly.

FIGS. 2A-2D depict an example impact-absorbing retention bracket 200 that may be employed in a window treatment installation, such as, for example, an overhead installation of a motorized roller shade. As shown, the retention bracket 200 may be configured as a two-part retention bracket that includes a first part 201 and a second part 203. The first part 201 defines a first end 202 and an opposed second end 204 that is spaced from the first end 202 along a longitudinal direction L. The second part 203 defines a first end 206 and an opposed second end 208 that is spaced from the first end 206 along the longitudinal direction L. As shown, the first part 201 and the second part 203 define equal lengths along the longitudinal direction L, as defined from the first end 202 to the second end 204 of the first part 201, and from the first end 206 to the second end 208 of the second part 203, respectively, for example. It should be appreciated that the first and second parts 201, 203 may alternatively be configured with different lengths.

The first part 201 defines a front wall 210 of the retention bracket 200. As shown, the front wall 210 defines an upper end 212 and a lower end 214 that is spaced from the upper end 212 along a transverse direction T that extends perpendicular to the longitudinal direction L. The first part 201 defines a rear wall 216 of the retention bracket 200. The rear wall 216 defines an upper end 218 and a lower end 220 that is spaced from the upper end 212 along the transverse direction T. As shown, the rear wall 216 is angularly offset relative to the transverse direction T. The first part 201 defines an upper wall 222 that extends from the front wall 210 to the rear wall 216. As shown, the upper wall 222 extends from the upper end 212 of the front wall 210 to the upper end 218 of the rear wall 216, along a lateral direction A that extends perpendicular to both the longitudinal direction L and the transverse direction T.

The front wall 210 defines a first portion 224 that extends along the transverse direction T, from the upper end 212 to a first intermediate location 226. The front wall 210 further defines a second portion that extends along a direction that is angularly offset relative to the transverse direction T, from the first intermediate location 226 to a second intermediate location 228. The second portion of the front wall 210 may be referred to as an angled portion 230 of the front wall 210. The front wall 210 further defines a third portion 232 that extends along the transverse direction T, from the second intermediate location 228 to the lower end 214. As shown, the rear wall 216 is angularly offset relative to the first portion 224, the angled portion 230, and the third portion 232 of the front wall 210.

The second part 203 defines a lower wall 234 of the retention bracket 200. The lower wall 234 extends from a near end 236 to a far end 238 that is spaced from the near end 236 along the lateral direction A. The near end 236 may be referred to as a first end of the lower wall 234, and the far end 238 may be referred to as a second end of the lower wall 234. As shown, the lower wall 234 extends from the near end 236 to the far end 238 along the lateral direction A, such that the lower wall 234 extends parallel to the upper wall 222.

The first and second parts 201, 203 of the retention bracket 200 may be configured to be removably attached to one another. For example, as shown, the first part 201 defines a tab 240 that extends from the lower end 214 of the front wall 210, along a length of the first part 201 from the first end 202 to the second end 204. The tab 240 may be configured to removably attach to a complementary portion of the lower wall 234. In this regard, the lower wall 234 may be removably attached to the lower end 214 of the front wall 210. As shown, the tab 240 defines a plurality of apertures 242 that extend therethrough along the transverse direction T, the apertures 242 aligned along the longitudinal direction L and spaced from one another between the first and second ends 202, 204.

The lower wall 234 defines a plurality of apertures 246 that extend therethrough along the transverse direction T. As shown, the apertures 246 may be aligned along the longitudinal direction L, proximate to the near end 236, and may be spaced from one another between the first and second ends 206, 208. The first and second parts 201, 203 may be configured such that the apertures 242 align with the apertures 246 when the first and second parts 201, 203 are removably attached to one another.

The second part 203 defines an alignment tab 244 that extends along the transverse direction T from the near end 236 of the lower wall 234, along a length of the second part from the first end 206 to the second end 208. As shown, an inner surface of the alignment tab 244 is configured to abut an outer surface of the third portion 232 of the front wall 210, so as to align the apertures 246 with the apertures 242. With the apertures 242, 246 in alignment, the first and second parts 201, 203, and thus the front wall 210 and the lower wall 234, may be attached to one another using fasteners (e.g., bolts 245, screws, etc.) disposed into the apertures 242 and the apertures 246.

The retention bracket 200 may be configured to be attached to structure, such as an architectural element of a building (e.g., a beam, a support, a truss, blocking, etc.). For example, as shown, the upper wall 222 defines a plurality of apertures 248 that extend therethrough along the transverse direction T, such that upper wall 222, and thus the retention bracket 200, may be attached to structure with respective fasteners (e.g., screws, lag bolts, etc.). As shown, the upper wall 222 may define six apertures 248 that are aligned in two arrays of three apertures 248 each, and that are aligned along the longitudinal direction L, and spaced apart from one another between the first and second ends 202, 204. It should be appreciated that the retention bracket 200 is not limited to the illustrated number, or locations, of the apertures 248, and that the retention bracket 200 may be alternatively configured with more or fewer apertures 248 in suitable locations, or may be configured to attach to structure in a different manner (e.g., with different fasteners or without fasteners).

As shown, the retention bracket 200 defines a substantially uniform thickness TH1 throughout the first and second parts 201, 203. In this regard, the front wall 210, the rear wall 216, the upper wall 222, and the lower wall 234 may be configured with a uniform thickness. It should be appreciated that the retention bracket 200 is not limited to having uniform thickness, and that the retention bracket 200 may alternatively be configured with one or more sections of varying thickness. For example, the retention bracket 200 may be configured such that the first part 201 defines a thickness that is different from a thickness of the second part 203.

It should further be appreciated that the retention bracket 200 is not limited to the illustrated geometry, and that one or both of the first and second parts 201, 203 may alternatively define other suitable geometries. For example, the retention bracket 200 is not limited to the illustrated intermediate locations 226 or 228, the angle by which the angled portion 230 of the front wall 210 is angularly offset from the first portion 224, the angle by which the rear wall 216 is angularly offset relative to the transverse direction T, and so on. The first and second parts 201, 203 of the retention bracket 200 may be made of any suitable material, such as metal (e.g., steel).

Figure 2A:
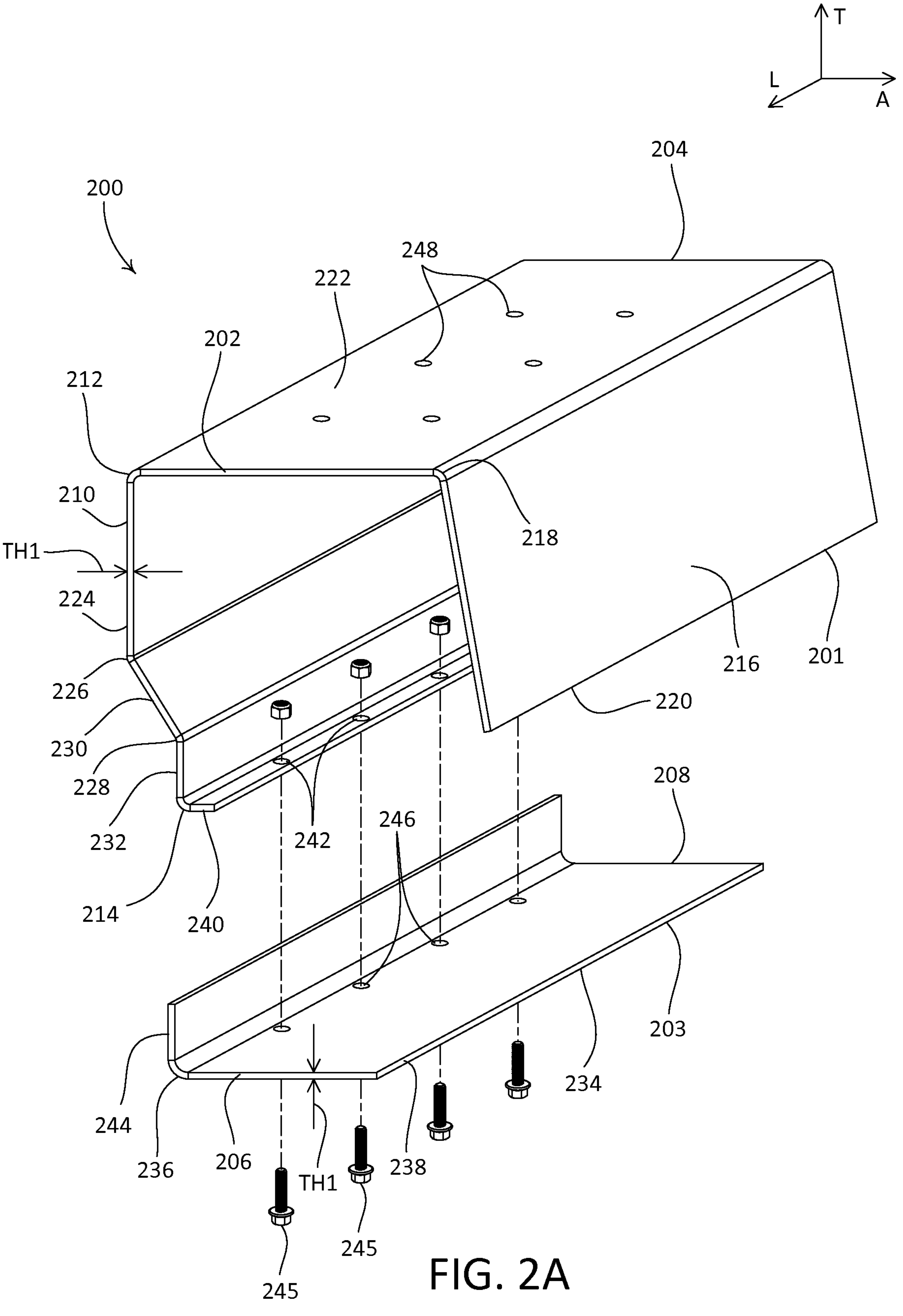
FIG. 2A is a perspective view of an example impact-absorbing retention bracket.
Figure 2B:
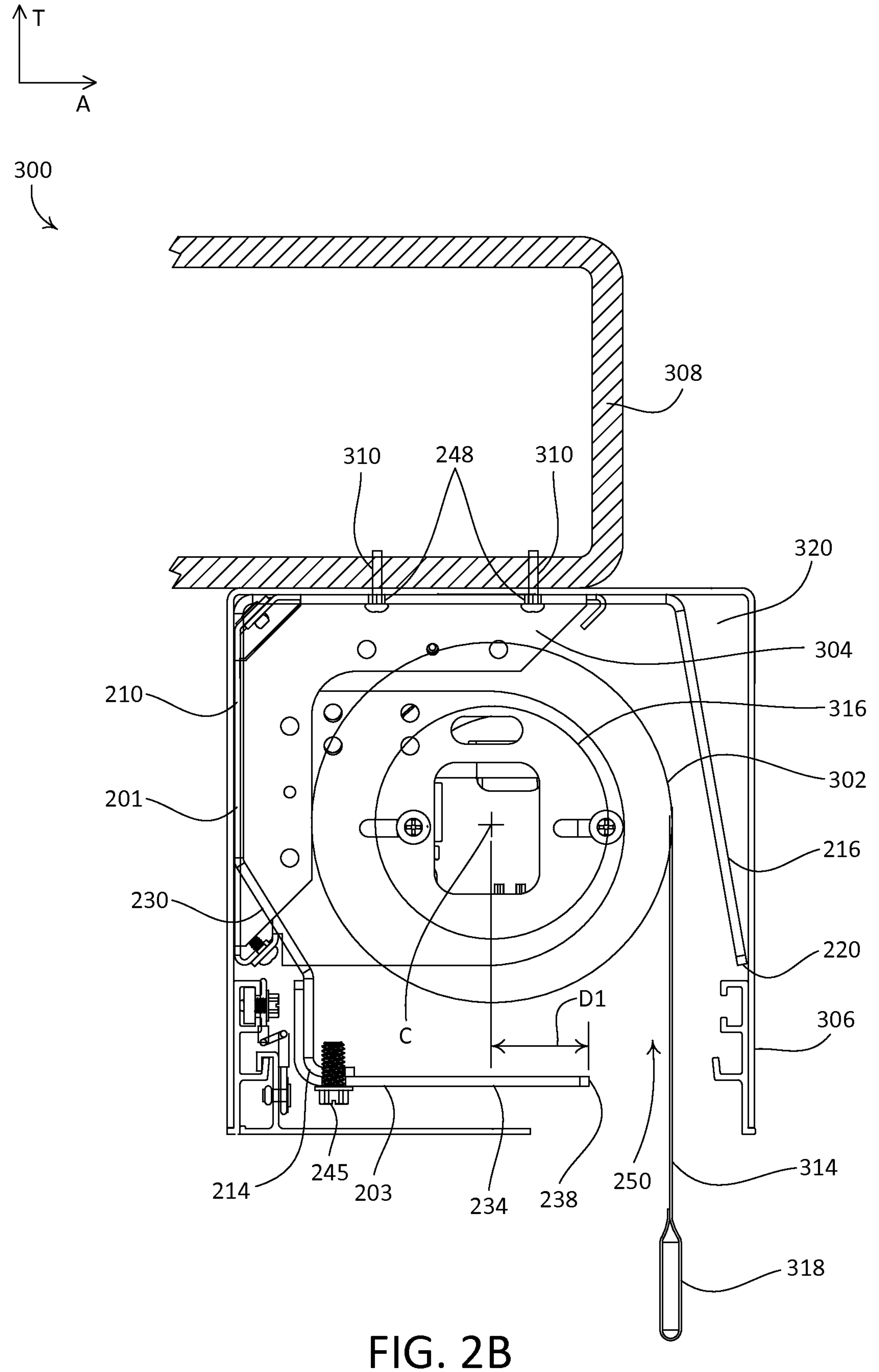
FIG. 2B is an end view of an example installation of the retention bracket shown in FIG. 2A, including a roller shade assembly and an enclosure.

FIG. 2B depicts an example roller shade installation 300 that may include one or more retention brackets 200. As shown, the roller shade installation 300 includes a roller shade assembly 302, two roller shade support brackets 304 (only one is visible) disposed at opposed first and second ends of the roller shade assembly 302, two retention brackets 200 (only one is visible), and an enclosure 306. As shown, the roller shade assembly is elongate along the longitudinal direction L. The retention brackets 200 may be spaced apart from each other along the longitudinal direction L. The roller shade assembly 302, in combination with the retention brackets 200, may be referred to as a roller shade retention system. As shown, the retention bracket 200 defines a pocket 320 between the rear wall 216 and a portion of the enclosure 306. The pocket 320 may be used, for example, to route cabling for the installation 300.

The roller shade support brackets 304, the retention brackets 200, and the enclosure 306 may be attached to, and/or supported by, one or more structures and/or architectural elements. In accordance with the illustrated roller shade installation 300, the roller shade support brackets 304, the retention brackets 200, and the enclosure 306 may be attached to a portion of a box beam 308, using screws 310. The roller shade assembly 302 may be attached to, and supported by, the roller shade support brackets 304. In this regard, it may be said that the roller shade assembly 302 is attached to the box beam 308 (e.g., indirectly via the roller shade support brackets 304) in a mounted position.

The roller shade assembly 302 may define opposed first and second ends 301, 303 that are spaced apart from each other along the longitudinal direction L. The first and second ends 301, 303 of the roller shade assembly 302 may be attached to, and supported by, the roller shade support brackets 304. The roller shade assembly 302 may include a covering material (e.g., a shade fabric 314) that may be raised and lowered, for example, to cover an opening. The roller shade assembly 302 further includes a roller tube 316, to which an upper end of the shade fabric 314 is attached. As shown, the longitudinal direction L extends parallel to an axis of rotation of the roller tube 316. The axis of rotation of the roller tube 316 may be more generally referred to as an axis of rotation of the roller shade assembly 302. The roller tube 316 may be driven by an electric motor drive unit (not shown) to raise and lower the shade fabric 314. The roller shade assembly 302 further includes a hembar 318 that is attached to a lower end of the shade fabric 314. The hembar 318 may be weighted, such that the hembar 318 causes the shade fabric 314 to hang (e.g., vertically).

The motor drive unit may be manually controlled (e.g., by actuating one or more buttons) and/or wirelessly controlled (e.g., using an infrared (IR) or radio frequency (RF) remote control unit). Examples of motor drive units for motorized roller shades are described in greater detail in U.S. Pat. No. 6,983,783, issued Jan. 10, 2006, entitled “Motorized Shade Control System,” U.S. Pat. No. 7,839,109, issued Nov. 23, 2010, entitled “Method Of Controlling A Motorized Window Treatment,” U.S. Patent Application Publication No. 2012/0261078, published Oct. 18, 2012, entitled “Motorized Window Treatment,” and U.S. Patent Application Publication No. 2013/0153162, published Jun. 20, 2013, entitled “Battery-Powered Motorized Window Treatment Having A Service Position,” the entire contents of each of which are incorporated herein by reference. It should be appreciated, however, that other suitable motor drive units or drive systems may be used to control the roller tube 316.

The first and second parts 201, 203 of the retention bracket 200 may be configured such that, when the retention bracket 200 is attached to structure (e.g., the box beam 308), the first end 202 of the first part 201 is aligned with the first end 206 of the second part 203 along the lateral direction A.

As shown, the retention bracket 200 may be configured such that, when the retention bracket 200 is attached to one or more structures and/or architectural elements (e.g., the box beam 308), and the roller shade assembly 302 is in the mounted position, the front wall 210 and the lower wall 234 at least partially enclose a portion of the roller shade assembly 302. The first and second parts 201, 203 of the retention bracket 200 may be configured such that, when the retention bracket 200 is attached to the box beam 308 and the roller shade assembly 302 is in the mounted position, a minimum clearance exists between the first and second parts 201, 203 and an outer circumference of the shade fabric 314 when the shade fabric 314 is in a raised position (e.g., with the shade fabric 314 wound onto the roller tube 316).

The retention bracket 200 may be configured to at least partially surround a corresponding portion of the roller shade assembly 302 such that the retention bracket 200 does not interfere with operation of the roller shade assembly 302.

For example, the retention bracket 200 may define an opening 250 through which the shade fabric 314 may be raised and lowered.

The opening 250 may be defined by the lower wall 234 and the rear wall 216. For example, as shown, the opening 250 may be defined by the far end 238 of the lower wall 234 and the lower end 220 of the rear wall 216. The opening 250 may be narrower than a diameter of the roller tube 316, such that the roller tube 316 will not fit through the opening 250 when the shade fabric 314 is completely unwound from the roller tube 316. With continued reference to the opening 250, the retention bracket 200 may be configured such that, when the retention bracket 200 is attached to one or more structures and/or architectural elements, and the roller shade assembly 302 is in the mounted position, the far end 238 of the lower wall 234 is spaced from a central axis C of the roller shade assembly 302 by a distance D1 that is less than half of the diameter of the roller tube 316, such that the lower wall 234 does not interfere with operation of the shade fabric 314. Alternatively, the retention bracket 200 may be configured such that a portion of the retention bracket 200 makes contact with the shade fabric 314, for example to guide the shade fabric 314.

Figure 2D:
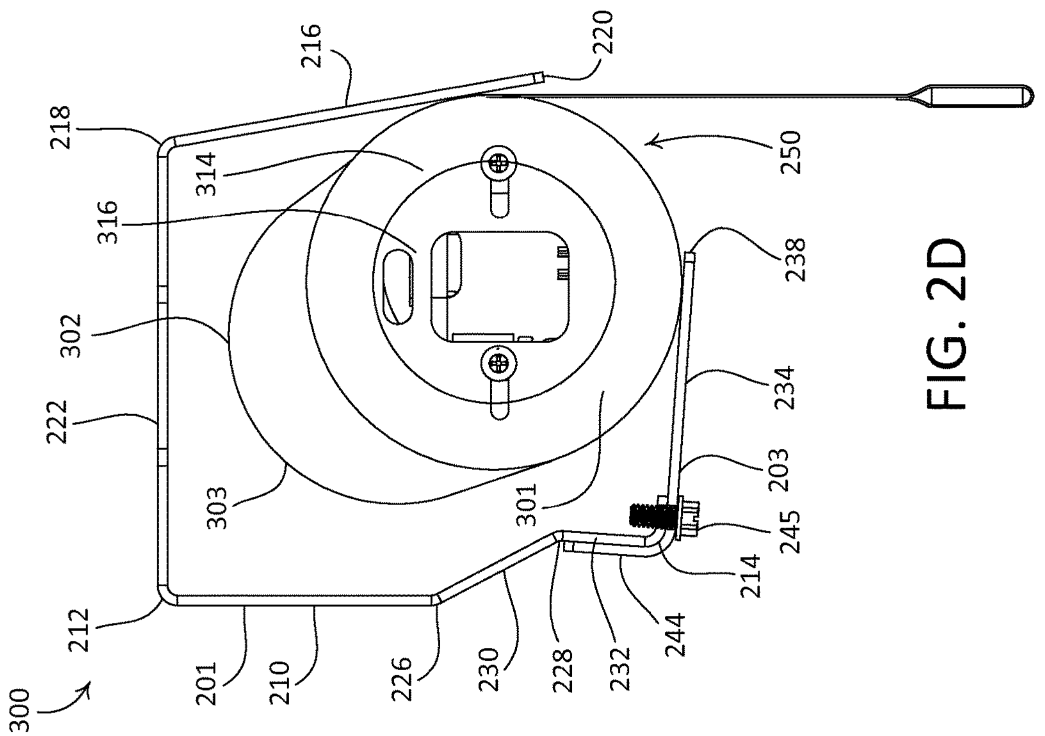
FIG. 2D is a simplified end view of the retention bracket and roller shade assembly shown in FIG. 2B, with the roller shade assembly detached from the mounted position.
Figure 2C:
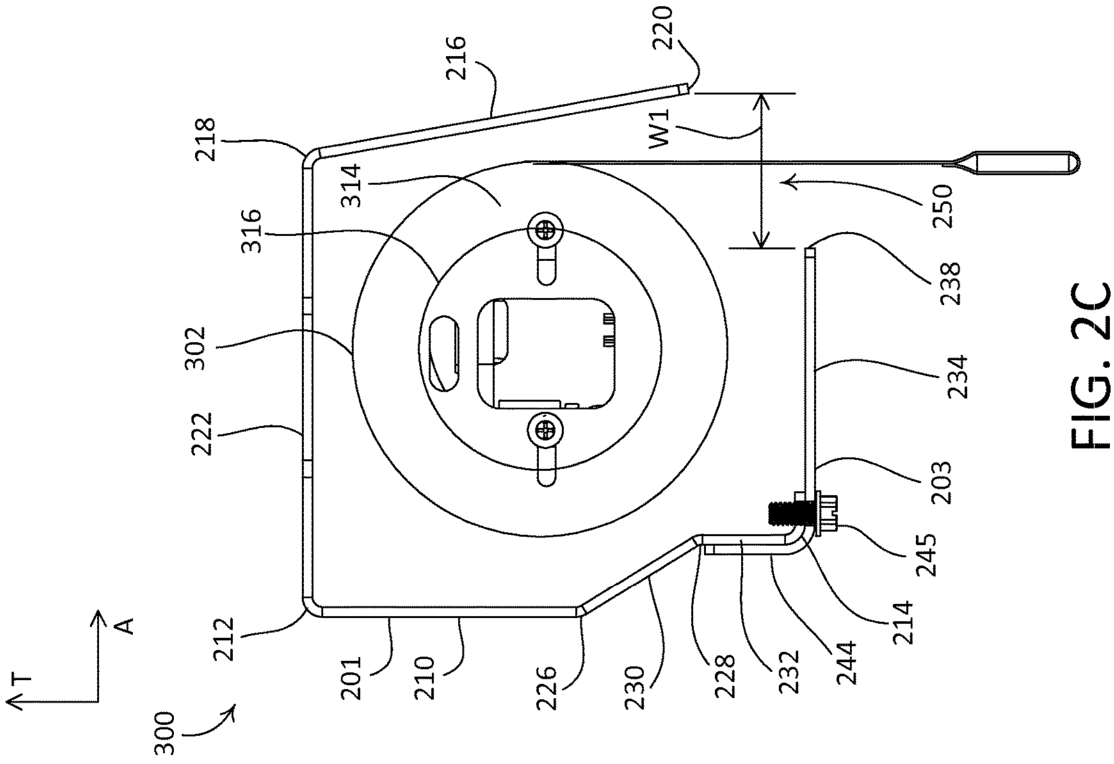
FIG. 2C is a simplified end view of the retention bracket and roller shade assembly shown in FIG. 2B, with the roller shade assembly attached in a mounted position.

FIGS. 2C and 2D are simplified illustrations of the example roller shade installation 300, omitting the roller shade support brackets 304, the enclosure 306, and the box beam 308. FIG. 2C depicts the roller shade assembly 302 in the mounted position. FIG. 2D depicts an example rest position of the roller shade assembly 302 after at least one of the first or second ends 301, 303 of the roller shade assembly 302 has become detached from the mounted position.

When the roller shade assembly 302 becomes detached from the mounted position, it may begin to fall towards the opening 250. As it falls, the roller shade assembly 302 may make contact with one or both of the retention brackets 200, thereby transferring an impact force to one or both of the retention brackets 200.

The retention brackets 200 may be configured to absorb corresponding portions of the impact force associated with detachment of the roller shade assembly 302 from the mounted position, and to limit displacement of the detached roller shade assembly 302 from the mounted position. In this regard, the retention brackets 200 may be configured to retain the detached roller shade assembly 302, such that the roller shade assembly 302 does not fall far from the mounted position.

The retention brackets 200 may be configured to deflect (or yield or bend or flex) upon absorbing corresponding portions of the impact force. For example, each retention bracket 200 may define a deflectable portion. The deflectable portion may correspond to one or more portions of the first part 201 and/or one or more portions of the second part 203. For example, the deflectable portion may include one or more of the first portion 224 of the front wall 210, the angled portion 230 of the front wall 210, the third portion 232 of the front wall 210, the alignment tab 244, the lower wall 234, or the rear wall 216. As shown in FIG. 2D, the retention bracket 200 may be configured such that the angled portion 230 of the front wall 210, the third portion 232 of the front wall 210, the alignment tab 244, and the lower wall 234 deflect downward and away from the roller shade assembly 302 upon impact. In this regard, the lower wall 234 and at least a portion of the front wall 210 (e.g., the angled portion 230 and the third portion 232) may be configured to deflect upon absorption of an impact force associated with detachment of the roller shade assembly 302 from the mounted position.

The retention bracket 200 may be configured to retain at least a portion of the roller shade assembly 302, such as the roller tube 316, after absorbing a respective portion of the impact force associated with detachment of the roller shade assembly 302. For example, upon absorbing a corresponding portion of the impact force, the retention bracket 200 may deform plastically under a load associated with the impact force. The retention bracket 200 may be configured to absorb the force such that expansion of the opening 250 is limited, for example such that a width W1 (e.g., defined along the lateral direction A) of the opening 250 does not expand beyond a distance equivalent to the diameter of the roller tube 316. In this regard, the retention bracket 200 may be configured to deflect during absorption of a corresponding portion of the impact force, such that the roller shade assembly 302 (e.g., the roller tube 316) does not pass through the opening 250.

The retention bracket 200 may be configured to support a static weight of the roller shade assembly 302 without deflecting, such that a second one of the retention brackets 200 may retain the roller shade assembly 302 if a first one of the retention brackets 200 deforms unexpectedly upon absorbing a corresponding portion of the impact load. For example, if a first one of the retention brackets 200 absorbs an unexpectedly large portion of the impact force that causes the first retention bracket 200 to deform such that the width W1 of the opening 250 of the first retention bracket 200 expands beyond a distance equivalent to the diameter of the roller tube 316, thereby allowing the roller tube 316 to pass through the opening 250, the second retention bracket 200 may absorb a remaining portion of the impact force, with minimal or no resulting deflection. Each retention bracket 200 may thus support, and thereby retain, the roller shade assembly 302. In this regard, the first and second retention brackets 200 may be configured to deflect during absorption of the corresponding portions of the impact force, such that the width of at least one of the respective openings 250 defined by the first and second retention brackets 200 does not expand beyond a distance that is equivalent to a diameter of the roller tube 316.

FIGS. 3A-3D depict another example impact-absorbing retention bracket 400. As shown, the retention bracket 400 may be configured as a two-part retention bracket that includes a first part 401 and a second part 403. The first part 401 defines a first end 406 and an opposed second end 408 that is spaced from the first end 406 along the longitudinal direction L. The second part 403 defines a first end 410 and an opposed second end 412 that is spaced from the first end 410 along the longitudinal direction L. As shown, the first part 401 and the second part 403 define equal lengths along the longitudinal direction L, as defined from the first 406 to the second end 408 of the first part 401, and from the first end 410 to the second end 412 of the second part 403, respectively, for example. It should be appreciated that the first and second parts 401, 403 may alternatively be configured with different lengths.

The first part 401 defines a front wall 402 of the retention bracket 400. As shown, the front wall 402 defines an upper end 414 and a lower end 416 that is spaced from the upper end 414 along the transverse direction T. The first part 401 defines an upper wall that may be referred to as a first upper wall 418, and a lower wall 420. The first upper wall 418 extends from the upper end 414 of the front wall 402, and the lower wall 420 extends from the lower end 416 of the front wall 402.

The front wall 402 defines a first portion 422 that extends along the transverse direction T, from the upper end 414 to an intermediate location 424. The front wall 402 further defines a second portion that extends along a direction that is angularly offset relative to the transverse direction T, from the intermediate location 424 to the lower end 416. The second portion of the front wall 402 may be referred to as an angled portion 426 of the front wall 402.

The first upper wall 418 extends from a near end that corresponds to the upper end 414 of the front wall 402, to a far end 428 that is spaced from the near end. The near end may be referred to as a first end of the first upper wall 418, and the far end 428 may be referred to as a second end of the first upper wall 418. As shown, the first upper wall 418 extends from the upper end 414 of the front wall 402 along the lateral direction A.

The lower wall 420 extends from a near end that corresponds to the lower end 416 of the front wall 402, to a far end 430 that is spaced from the near end. The near end may be referred to as a first end of the lower wall 420, and the far end 430 may be referred to as a second end of the lower wall 420. As shown, the lower wall 420 extends from the lower end 416 of the front wall 402 along the lateral direction A, such that the lower wall 420 extends parallel to the first upper wall 418.

The second part 403 defines a rear wall 404 of the retention bracket 400. As shown, the rear wall 404 defines an upper end 432 and a lower end 434 that is spaced from the upper end 432 along the transverse direction T. The second part 403 defines an upper wall that may be referred to as a second upper wall 436. The second upper wall 436 extends from the upper end 432 of the rear wall 404. The rear wall 404 defines a first portion 438 that extends along the transverse direction T, from the upper end 414 to an intermediate location 440. The rear wall 404 further defines a second portion that extends along a direction that is angularly offset relative to the transverse direction T, from the intermediate location 440 to the lower end 434. The second portion of the rear wall 404 may be referred to as an angled portion 442 of the rear wall 404. As shown, the angled portion 442 is proximate the lower end 434 of the rear wall 404.

The second upper wall 436 extends from a near end that corresponds to the upper end 432 of the rear wall 404, to a far end 444 that is spaced from the near end. The near end may be referred to as a first end of the second upper wall 436, and the far end 444 may be referred to as a second end of the second upper wall 436. As shown, the second upper wall 436 extends from the upper end 432 of the rear wall 404 along the lateral direction A.

The retention bracket 400 may be configured to be attached to structure, such as an architectural element of a building (e.g., a beam, a support, a truss, blocking, etc.). For example, as shown, the first upper wall 418 and the second upper wall 436 of the retention bracket 400 define respective pluralities of apertures 446 that extend therethrough along the transverse direction T, such that the first and second upper walls 418, 436, and thus the retention bracket 400, may be attached to structure with respective fasteners (e.g., screws, lag bolts, etc.). As shown, the first upper wall 418 may define four apertures 446 that are spaced apart between the first and second ends 406, 408 and are located proximate to the far end 428, and the second upper wall 436 may define four apertures 446 that are spaced apart between the first and second ends 410, 412 and are located proximate to the far end 444. It should be appreciated that the retention bracket 400 is not limited to the illustrated number or locations of the apertures 446, and that the retention bracket 400 may be alternatively configured with more or fewer apertures 446 in suitable locations, or may be configured to attach to structure in a different manner (e.g., with different fasteners or without fasteners).

As shown, the retention bracket 400 defines a substantially uniform thickness TH2 throughout the first and second parts 401, 403. In this regard, the front wall 402, the rear wall 404, the first upper wall 418, the second upper wall 436, and the lower wall 420 may be configured with a uniform thickness. It should be appreciated that the retention bracket 400 is not limited to having uniform thickness, and that the retention bracket 400 may alternatively be configured with one or more sections of varying thickness. For example, the retention bracket 400 may be configured such that the first part 401 defines a thickness that is different from a thickness of the second part 403.

It should further be appreciated that the retention bracket 400 is not limited to the illustrated geometry, and that one or both of the first and second parts 401, 403 may alternatively define other suitable geometries. For example, the retention bracket 400 is not limited to the illustrated intermediate locations 424 or 440, the angle by which the angled portion 426 of the front wall 402 is angularly offset from the first portion 422, the angle by which the angled portion 442 of the rear wall 404 is angularly offset from the first portion 438, and so on. The first and second parts 401, 403 of the retention bracket 400 may be made of any suitable material, such as metal (e.g., steel).

Figure 3A:
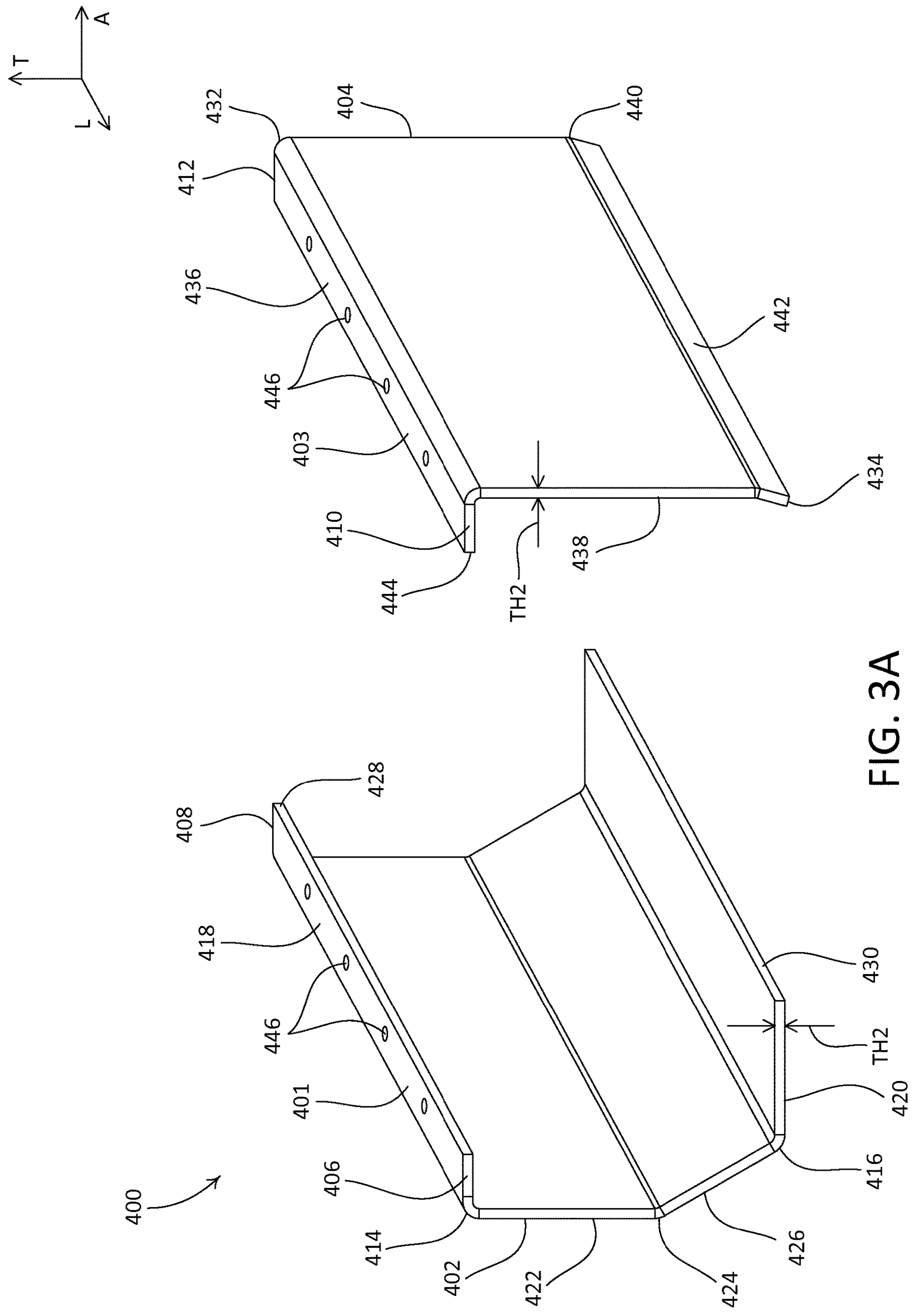
FIG. 3A is a perspective view of another example impact-absorbing retention bracket.
Figure 3B:
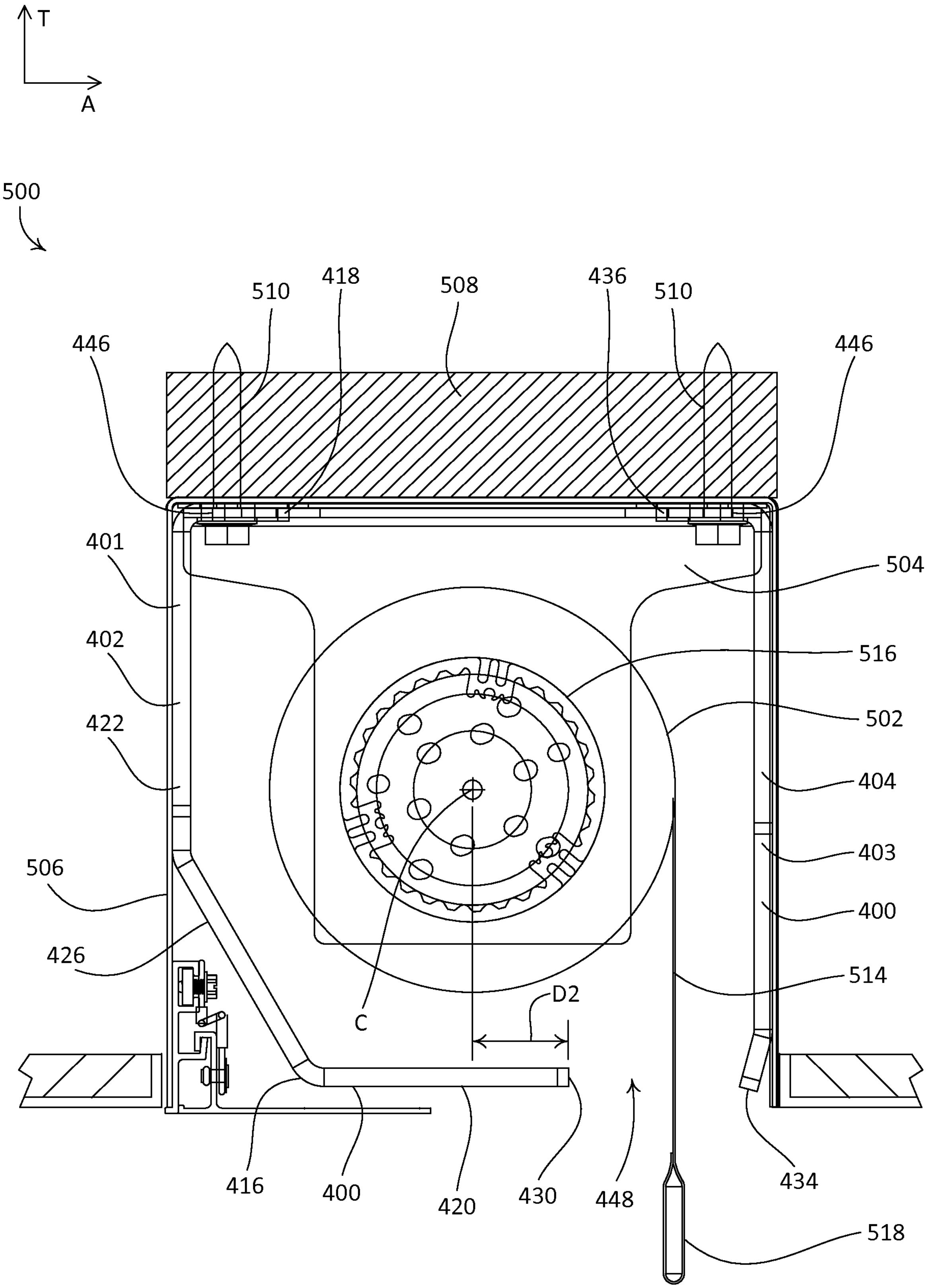
FIG. 3B is an end view of an example installation of the retention bracket shown in FIG. 3A, including a roller shade assembly and an enclosure.

FIG. 3B depicts an example roller shade installation 500 that may include one or more retention brackets 400. As shown, the roller shade installation 500 includes a roller shade assembly 502, two roller shade support brackets 504 (only one is visible) disposed at opposed first and second ends of the roller shade assembly 502, two retention brackets 400 (only one is visible), and an enclosure 506. The retention brackets 400 may be spaced apart from each other along the longitudinal direction L. The roller shade assembly 502, in combination with the retention brackets 400, may be referred to as a roller shade retention system.

The roller shade support brackets 504, the retention brackets 400, and the enclosure 506 may be attached to, and/or supported by, one or more structures and/or architectural elements. In accordance with the illustrated roller shade installation 500, the roller shade support brackets 504, the retention brackets 400, and the enclosure 506 may be attached to surrounding blocking 508, using screws 510. The roller shade assembly 502 may be attached to, and supported by, the roller shade support brackets 504. In this regard, it may be said that the roller shade assembly 502 is attached to the blocking 508 (e.g., indirectly via the roller shade support brackets 504) in a mounted position.

The roller shade assembly 502 may define opposed first and second ends 501, 503 that are spaced apart from each other along the longitudinal direction L. The first and second ends 501, 503 of the roller shade assembly 502 may be attached to, and supported by, the roller shade support brackets 504. The roller shade assembly 502 may include a covering material (e.g., a shade fabric 514) that may be raised and lowered, for example, to cover an opening. The roller shade assembly 502 further includes a roller tube 516, to which an upper end of the shade fabric 514 is attached. The roller tube 516 may be driven by an electric motor drive unit (not shown) to raise and lower the shade fabric 514. The roller shade assembly 502 further includes a hembar 518 that is attached to a lower end of the shade fabric 514. The hembar 518 may be weighted, such that the hembar 518 causes the shade fabric 514 to hang (e.g., vertically).

The first and second parts 401, 403 of the retention bracket 400 may be configured such that, when the retention bracket 400 is attached to structure (e.g., the blocking 508), the front wall 402 is spaced from the rear wall 404, the first end 406 of the first part 401 is aligned with the first end 410 of the second part 403 along the lateral direction A, and the lower end 416 of the front wall 402 and the lower end 434 of the rear wall 404 are equally spaced from the structure.

As shown, the retention bracket 400 may be configured such that, when the retention bracket 400 is attached to one or more structures and/or architectural elements (e.g., the blocking 508), and the roller shade assembly 502 is in the mounted position, the front wall 402 and the lower wall 420 at least partially enclose a portion of the roller shade assembly 502. The first and second parts 401, 403 of the retention bracket 400 may be configured such that, when the retention bracket 400 is attached to the blocking 508 and the roller shade assembly 502 is in the mounted position, a minimum clearance exists between the first and second parts 401, 403 and an outer circumference of the shade fabric 514 when the shade fabric 514 is in a raised position (e.g., with the shade fabric 514 wound onto the roller tube 516).

The retention bracket 400 may be configured to at least partially surround a corresponding portion of the roller shade assembly 502 such that the retention bracket 400 does not interfere with operation of the roller shade assembly 502. For example, the retention bracket 400 may define an opening 448 through which the shade fabric 514 may be raised and lowered.

The opening 448 may be defined by the lower wall 420 and the rear wall 404. For example, as shown, the opening 448 may be defined by the far end 430 of the lower wall 420 and the lower end 434 of the rear wall 404. The opening 448 may be narrower than a diameter of the roller tube 516, such that the roller tube 516 will not fit through the opening 448 when the shade fabric 514 is completely unwound from the roller tube 516. With continued reference to the opening 448, the retention bracket 400 may be configured such that, when the retention bracket 400 is attached to one or more structures and/or architectural elements and the roller shade assembly 502 is in the mounted position, the far end 430 of the lower wall 420 is spaced from a central axis C of the roller shade assembly 502 by a distance D2 that is less than half of the diameter of the roller tube 516, such that the lower wall 420 does not interfere with operation of the shade fabric 514. Alternatively, the retention bracket 400 may be configured such that a portion of the retention bracket 400 makes contact with the shade fabric 514, for example to guide the shade fabric 514.

Figure 3D:
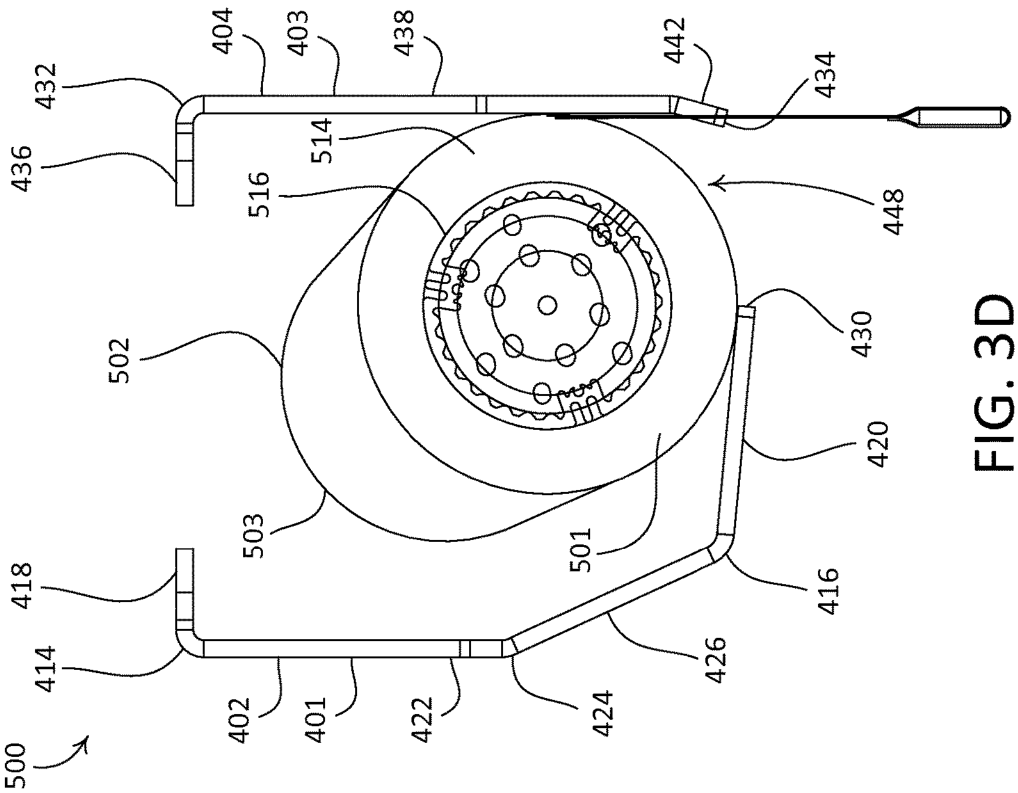
FIG. 3D is a simplified end view of the retention bracket and roller shade assembly shown in FIG. 3B, with the roller shade assembly detached from the mounted position.
Figure 3C:
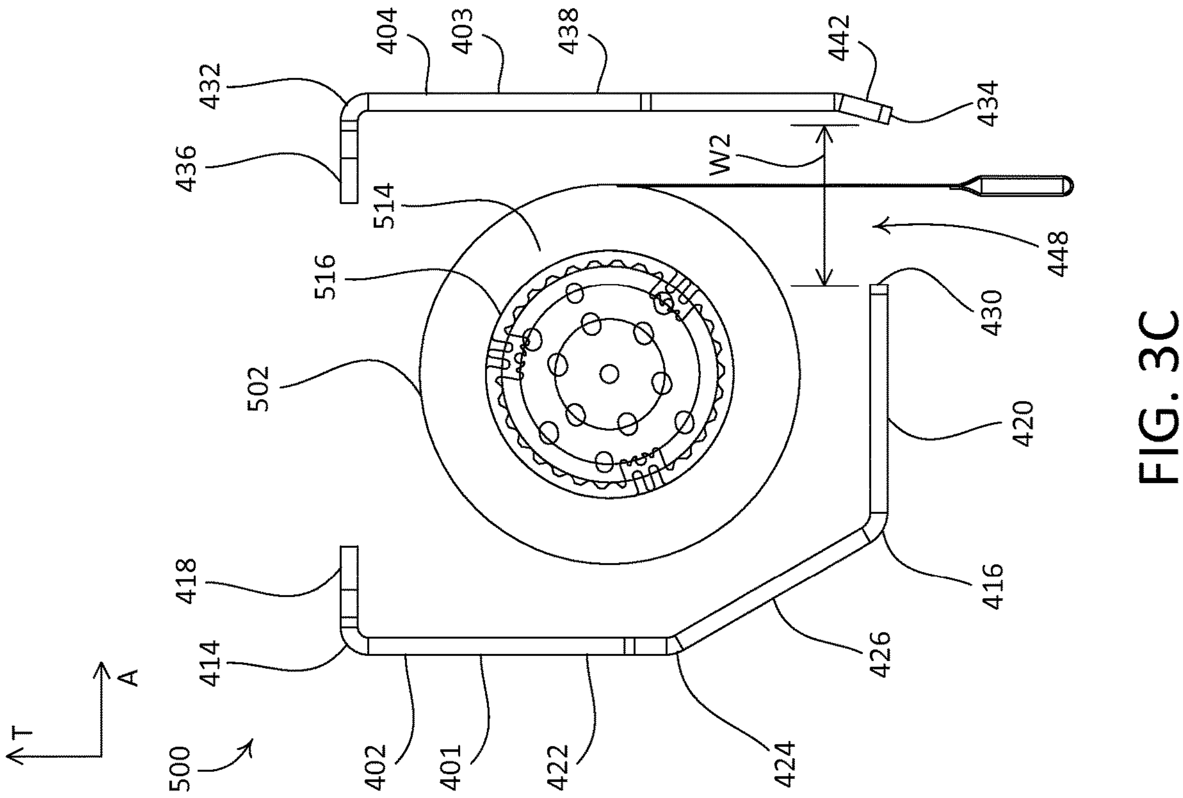
FIG. 3C is a simplified end view of the retention bracket and roller shade assembly shown in FIG. 3B, with the roller shade assembly attached in a mounted position.

FIGS. 3C and 3D are simplified illustrations of the example roller shade installation 500, omitting the roller shade support brackets 504, the enclosure 506, and the blocking 508. FIG. 3C depicts the roller shade assembly 502 in the mounted position. FIG. 3D depicts an example rest position of the roller shade assembly 502 after at least one of the first or second ends 501, 503 of the roller shade assembly 502 has become detached from the mounted position.

When the roller shade assembly 502 becomes detached from the mounted position, it may begin to fall towards the opening 448. As it falls, the roller shade assembly 502 may make contact with one or both of the retention brackets 400, thereby transferring an impact force to one or both of the retention brackets 400.

The retention brackets 400 may be configured to absorb corresponding portions of the impact force associated with detachment of the roller shade assembly 502 from the mounted position, and to limit displacement of the detached roller shade assembly 502 from the mounted position. In this regard, the retention brackets 400 may be configured to retain the detached roller shade assembly 502, such that the roller shade assembly 502 does not fall far from the mounted position.

The retention brackets 400 may be configured to deflect upon absorbing corresponding portions of the impact force. For example, each retention bracket 400 may define a deflectable portion. The deflectable portion may correspond to one or more portions of the first part 401 and/or one or more portions of the second part 403. For example, the deflectable portion may include one or more of the first portion 422 of the front wall 402, the angled portion 426 of the front wall 402, the lower wall 420, the first portion 438 of the rear wall 404, or the angled portion 442 of the rear wall 404. As shown in FIG. 3D, the retention bracket 400 may be configured such that the angled portion 426 of the front wall 402 and the lower wall 420 deflect downward and away from the roller shade assembly 502 upon impact. In this regard, the lower wall 420 and at least a portion of the front wall 402 (e.g., the angled portion 426) may be configured to deflect upon absorption of an impact force associated with detachment of the roller shade assembly 502 from the mounted position.

The retention bracket 400 may be configured to retain at least a portion of the roller shade assembly 502, such as the roller tube 516, after absorbing a respective portion of the impact force associated with detachment of the roller shade assembly 502. For example, upon absorbing a corresponding portion of the impact force, the retention bracket 400 may deform plastically under a load associated with the impact force. The retention bracket 400 may be configured to absorb the load such that expansion of the opening 448 is limited, for example, such that a width W2 (e.g., defined along the lateral direction A) of the opening 448 does not expand beyond a distance equivalent to the diameter of the roller tube 516. In this regard, the retention bracket 400 may be configured to deflect during absorption of a corresponding portion of the impact force, such that the roller shade assembly 502 (e.g., the roller tube 516) does not pass through the opening 448.

The retention bracket 400 may be configured to support a static weight of the roller shade assembly 502 without deflecting, such that a second one of the retention brackets 400 may retain the roller shade assembly 502 if a first one of the retention brackets 400 deforms unexpectedly upon absorbing a corresponding portion of the impact load. For example, if a first one of the retention brackets 400 absorbs an unexpectedly large portion of the impact force that causes the first retention bracket 400 to deform such that the width W2 of the opening 448 of the first retention bracket 400 expands beyond a distance equivalent to the diameter of the roller tube 516, thereby allowing the roller tube 516 to pass through the opening 448, the second retention bracket 400 may absorb a remaining portion of the impact force, with minimal or no resulting deflection. Each retention bracket 400 may thus support, and thereby retain, the roller shade assembly 502. In this regard, the first and second retention brackets 400 may be configured to deflect during absorption of the corresponding portions of the impact force, such that the width of at least one of the respective openings 448 defined by the first and second retention brackets 400 does not expand beyond a distance that is equivalent to a diameter of the roller tube 516.

FIGS. 4A-4D depict another example impact-absorbing retention bracket 600. As shown, the retention bracket 600 defines a first end 602 and an opposed second end 604 that is spaced from the first end 602 along the longitudinal direction L. The retention bracket 600 includes a front wall 606 that defines an upper end 608 and a lower end 610 that is spaced from the upper end 608 along the transverse direction T. The retention bracket 600 includes an upper wall 612 that extends from the upper end 608 of the front wall 606, and a lower wall 614 that extends from the lower end 610 of the front wall 606.

As shown, the front wall 606 defines a first portion 616 that extends along the transverse direction T, from the upper end 608 to an intermediate location 618. The front wall 606 further defines a second portion that extends along a direction that is angularly offset relative to the transverse direction T, from the intermediate location 618 to the lower end 610. The second portion of the front wall 606 may be referred to as an angled portion 620 of the front wall 606.

The upper wall 612 extends from a near end that corresponds to the upper end 608 of the front wall 606, to a far end 622 that is spaced from the near end. The near end may be referred to as a first end of the upper wall 612, and the far end 622 may be referred to as a second end of the upper wall 612. As shown, the upper wall 612 extends from the upper end 608 of the front wall 606 along the lateral direction A.

The lower wall 614 extends from a near end that corresponds to the lower end 610 of the front wall 606, to a far end 624 that is spaced from the near end. The near end may be referred to as a first end of the lower wall 614, and the far end 624 may be referred to as a second end of the lower wall 614. As shown, the lower wall 614 extends from the lower end 610 of the front wall 606 along the lateral direction A, such that the lower wall 614 extends parallel to the upper wall 612.

The retention bracket 600 may be configured to be attached to structure, such as an architectural element of a building (e.g., a beam, a support, a truss, blocking, etc.). For example, as shown, the upper wall 612 may define a plurality of apertures 626 that extend therethrough along the transverse direction T, such that the upper wall 612, and thus the retention bracket 600, may be attached to a structure with one or more fasteners (e.g., screws, lag bolts, etc.). As shown, the retention bracket 600 may define three apertures 626 that are spaced apart between the first and second ends 602, 604 of the retention bracket 600, and are located proximate to the far end 622 of the upper wall 612. It should be appreciated that the retention bracket 600 is not limited to the illustrated number, or locations, of the apertures 626, and that the retention bracket 600 may be alternatively configured with more or fewer apertures 626 in suitable locations, or may be configured to be attached to structure in a different manner (e.g., with different fasteners or without fasteners).

As shown, the retention bracket 600 defines a substantially uniform thickness TH3 throughout the front wall 606, the upper wall 612, and the lower wall 614. It should be appreciated that the retention bracket 600 is not limited to having uniform thickness, and that the retention bracket 600 may alternatively be configured with one or more sections of varying thickness. It should further be appreciated that the retention bracket 600 is not limited to the illustrated geometry, and that the retention bracket 600 may alternatively define another suitable geometry. For example, the retention bracket 600 is not limited to the illustrated intermediate location 618, the angle by which the angled portion 620 of the front wall 606 is angularly offset from the first portion 616, and so on. The retention bracket 600 may be made of any suitable material, such as metal (e.g., steel).

Figure 4A:
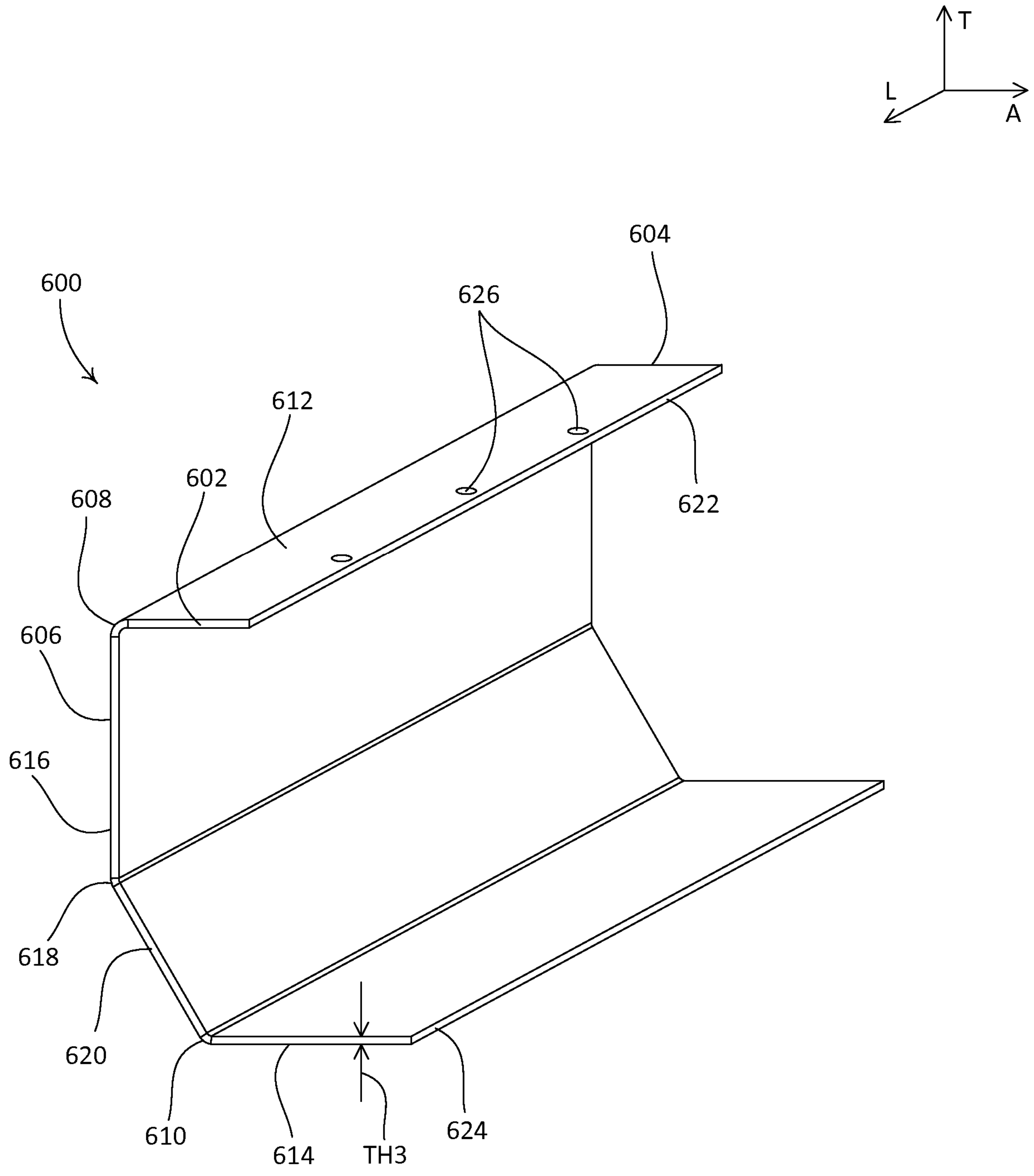
FIG. 4A is a perspective view of another example impact-absorbing retention bracket.
Figure 4B:
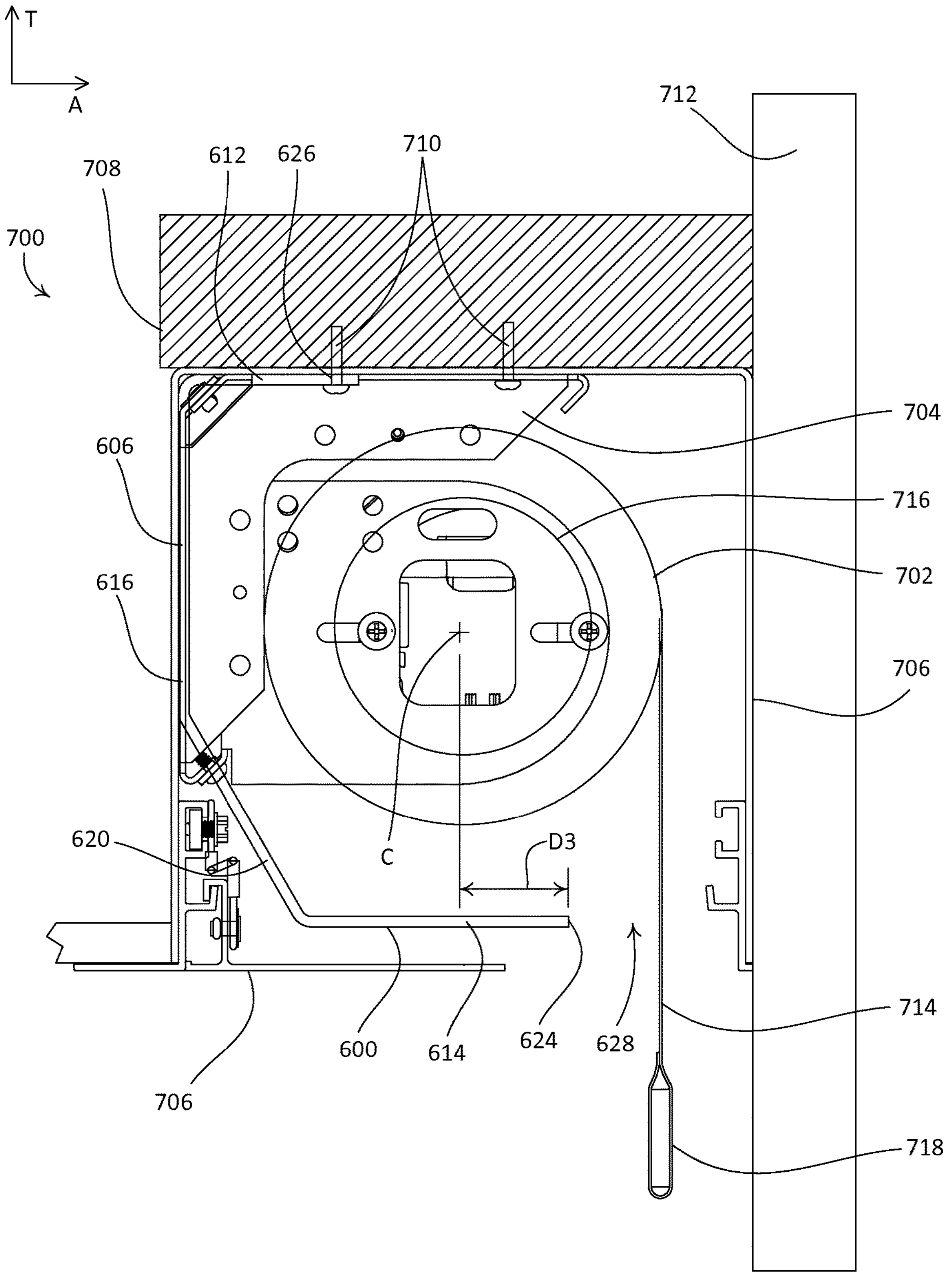
FIG. 4B is an end view of an example installation of the retention bracket shown in FIG. 4A, including a roller shade assembly and an enclosure.

FIG. 4B depicts an example roller shade installation 700 that may include one or more retention brackets 600. As shown, the roller shade installation 700 includes a roller shade assembly 702, two roller shade support brackets 704 (only one is visible) disposed at opposed first and second ends of the roller shade assembly 702, two retention brackets 600 (only one is visible), and an enclosure 706. The retention brackets 600 may be spaced apart from each other along the longitudinal direction L. The roller shade assembly 702, in combination with the retention brackets 600, may be referred to as a roller shade retention system.

The roller shade support brackets 704, the retention brackets 600, and the enclosure 706 may be attached to, and/or supported by, one or more structures and/or architectural elements. In accordance with the illustrated roller shade installation 700, the roller shade support brackets 704, the retention brackets 600, and the enclosure 706 may be attached to surrounding blocking 708, using screws 710. The roller shade assembly 702 may be attached to, and supported by, the roller shade support brackets 704. In this regard, it may be said that the roller shade assembly 702 is attached to the blocking 708 (e.g., indirectly via the roller shade support brackets 704) in a mounted position. In the illustrated installation 700, a portion of the enclosure 706 is supported by a mullion 712.

The roller shade assembly 702 may define opposed first and second ends 701, 703 that are spaced apart from each other along the longitudinal direction L. The first and second ends 701, 703 of the roller shade assembly 702 may be attached to, and supported by, the roller shade support brackets 704. The roller shade assembly 702 may include a covering material (e.g., a shade fabric 714) that may be raised and lowered, for example, to cover an opening. The roller shade assembly 702 further includes a roller tube 716, to which an upper end of the shade fabric 714 is attached. The roller tube 716 may be driven by an electric motor drive unit (not shown) to raise and lower the shade fabric 714. The roller shade assembly 702 further includes a hembar 718 that is attached to a lower end of the shade fabric 714. The hembar 718 may be weighted, such that the hembar 718 causes the shade fabric 714 to hang (e.g., vertically).

As shown, the retention bracket 600 may be configured such that, when the retention bracket 600 is attached to one or more structures and/or architectural elements (e.g., the blocking 708), and the roller shade assembly 702 is in the mounted position, the front wall 606 and the lower wall 614 at least partially enclose a portion of the roller shade assembly 702. The retention bracket 600 may be configured such that, when the retention bracket 600 is attached to the blocking 708 and the roller shade assembly 702 is in the mounted position, a minimum clearance exists between the retention bracket 600 and an outer circumference of the shade fabric 714 when the shade fabric 714 is in a raised position (e.g., with the shade fabric 714 wound onto the roller tube 716).

The retention bracket 600 may be configured to at least partially surround a corresponding portion of the roller shade assembly 702 such that the retention bracket 600 does not interfere with operation of the roller shade assembly 702. For example, the retention bracket 600 may at least partially define an opening 628 through which the shade fabric 714 may be raised and lowered.

As shown, the opening 628 may be defined by the far end 624 of the lower wall 614, and by a corresponding portion of the enclosure 706 (e.g., a portion of the enclosure 706 that is spaced from the far end 624 of the lower wall 614 along the lateral direction A). The opening 628 may be narrower than a diameter of the roller tube 716, such that the roller tube 716 will not fit through the opening 628 when the shade fabric 714 is completely unwound from the roller tube 716. With continued reference to the opening 628, the retention bracket 600 may be configured such that, when the retention bracket 600 is attached to one or more structures and/or architectural elements, and the roller shade assembly 702 is in the mounted position, the far end 624 of the lower wall 614 is spaced from a central axis C of the roller shade assembly 702 by a distance D3 that is less than half of the diameter of the roller tube 716, such that the lower wall 614 does not interfere with operation of the shade fabric 714. Alternatively, the retention bracket 600 may be configured such that a portion of the retention bracket 600 makes contact with the shade fabric 714, for example to guide the shade fabric 714.

Figure 4D:
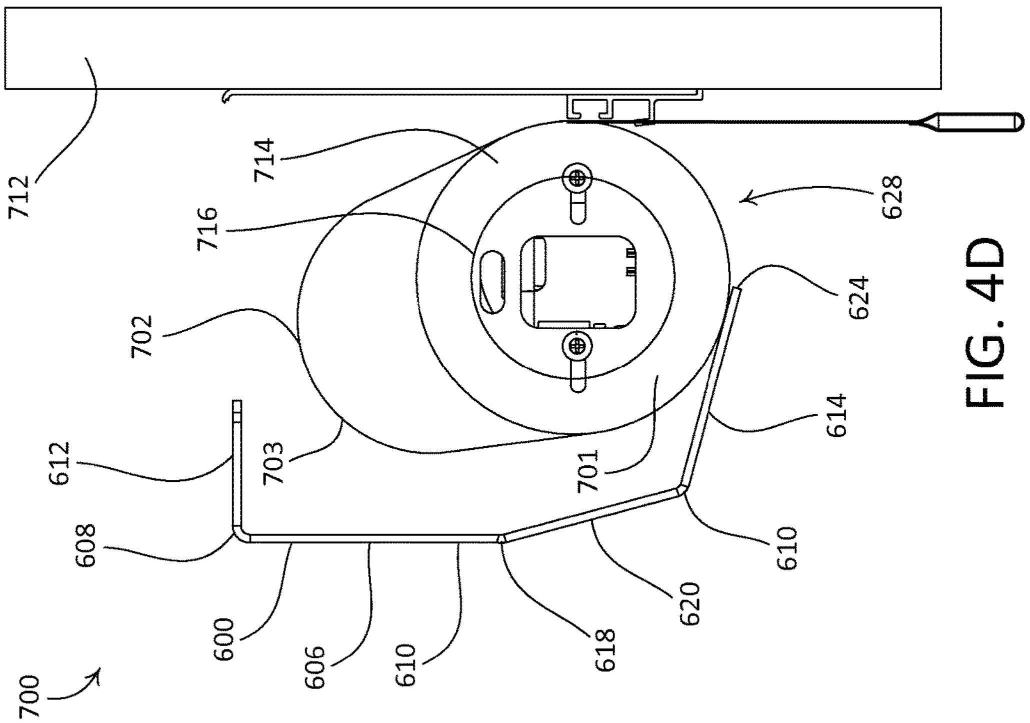
FIG. 4D is a simplified end view of the retention bracket and roller shade assembly shown in FIG. 4B, with the roller shade assembly detached from the mounted position.
Figure 4C:
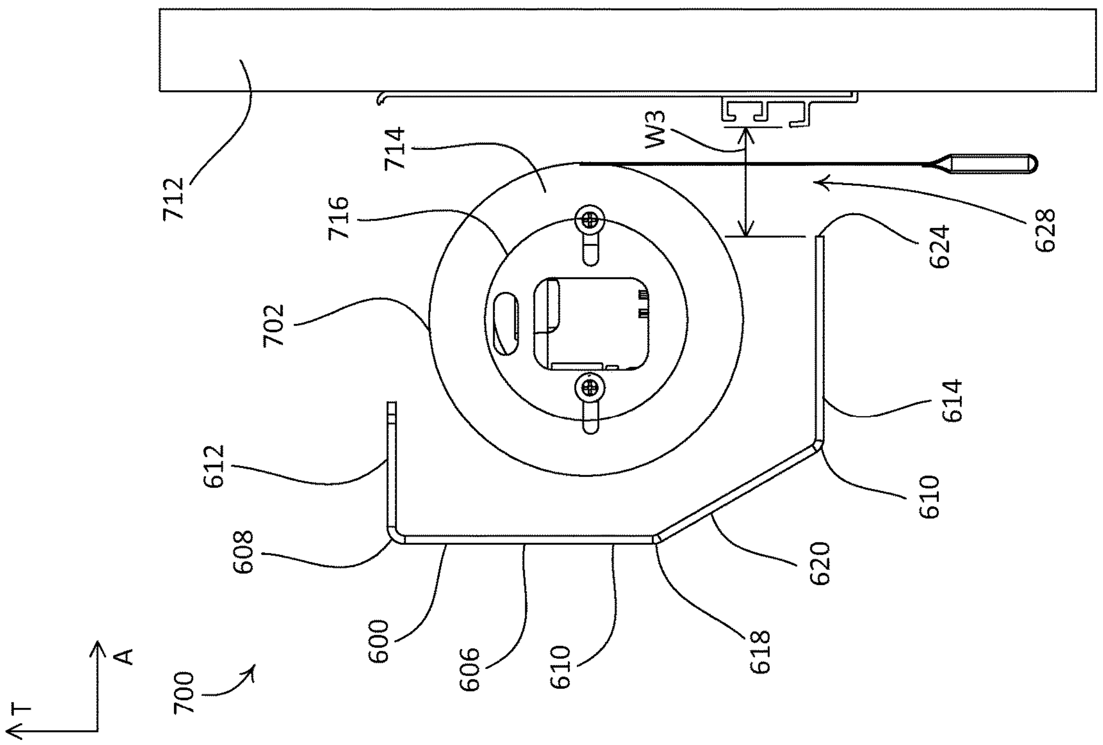
FIG. 4C is a simplified end view of the retention bracket and roller shade assembly shown in FIG. 4B, with the roller shade assembly attached in a mounted position.

FIGS. 4C and 4D are simplified illustrations of the example roller shade installation 700, omitting the roller shade support brackets 704, the enclosure 706, and the blocking 708. FIG. 4C depicts the roller shade assembly 702 in the mounted position. FIG. 4D depicts an example rest position of the roller shade assembly 702 after at least one of the first or second ends 701, 703 of the roller shade assembly 702 has become detached from the mounted position.

When the roller shade assembly 702 becomes detached from the mounted position, it may begin to fall towards the opening 628. As it falls, the roller shade assembly 702 may make contact with one or both of the retention brackets 600, thereby transferring an impact force to one or both of the retention brackets 600.

The retention brackets 600 may be configured to absorb corresponding portions of the impact force associated with detachment of the roller shade assembly 702 from the mounted position, and to limit displacement of the detached roller shade assembly 702 from the mounted position. In this regard, the retention brackets 600 may be configured to retain the detached roller shade assembly 702, such that the roller shade assembly 702 does not fall far from the mounted position.

The retention brackets 600 may be configured to deflect upon absorbing corresponding portions of the impact force. For example, each retention bracket 600 may define a deflectable portion. The deflectable portion may correspond to one or more portions of the front wall 606 (e.g., the first portion 616 and/or the angled portion 620) and/or the lower wall 614. For example, the deflectable portion may include one or more of the first portion 616 of the front wall 606, the angled portion 620 of the front wall 606, or the lower wall 614. As shown in FIG. 4D, the retention bracket 600 may be configured such that the angled portion 620 of the front wall 606 and the lower wall 614 deflect downward and away from the roller shade assembly 702 upon impact. In this regard, the lower wall 614 and at least a portion of the front wall 606 (e.g., the angled portion 620) may be configured to deflect upon absorption of an impact force associated with detachment of the roller shade assembly 702 from the mounted position.

The retention bracket 600 may be configured to retain at least a portion of the roller shade assembly 702, such as the roller tube 716, after absorbing a respective portion of the impact force associated with detachment of the roller shade assembly 702. For example, upon absorbing a corresponding portion of the impact force, the retention bracket 600 may deform plastically under a load associated with the impact force. The retention bracket 600 may be configured to absorb the load such that expansion of the opening 628 is limited, for example, such that a width W3 (e.g., defined along the lateral direction A) of the opening 628 does not expand beyond a distance equivalent to the diameter of the roller tube 716. In this regard, the retention bracket 600 may be configured to deflect during absorption of a corresponding portion of the impact force, such that the roller shade assembly 702 (e.g., the roller tube 716) does not pass through the opening 628.

The retention bracket 600 may be configured to support a static weight of the roller shade assembly 702 without deflecting, such that a second one of the retention brackets 600 may retain the roller shade assembly 702 if a first one of the retention brackets 600 deforms unexpectedly upon absorbing a corresponding portion of the impact load. For example, if a first one of the retention brackets 600 absorbs an unexpectedly large portion of the impact force that causes the first retention bracket 600 to deform such that the width W3 of the opening 628 of the first retention bracket 600 expands beyond a distance equivalent to the diameter of the roller tube 716, thereby allowing the roller tube 716 to pass through the opening 628, the second retention bracket 600 may absorb a remaining portion of the impact force, with minimal or no resulting deflection. Each retention bracket 600 may thus support, and thereby retain, the roller shade assembly 702. In this regard, the first and second retention brackets 600 may be configured to deflect during absorption of the corresponding portions of the impact force, such that the width of at least one of the respective openings 628 of the first and second retention brackets 600 does not expand beyond a distance that is equivalent to a diameter of the roller tube 716.

Figure 5:
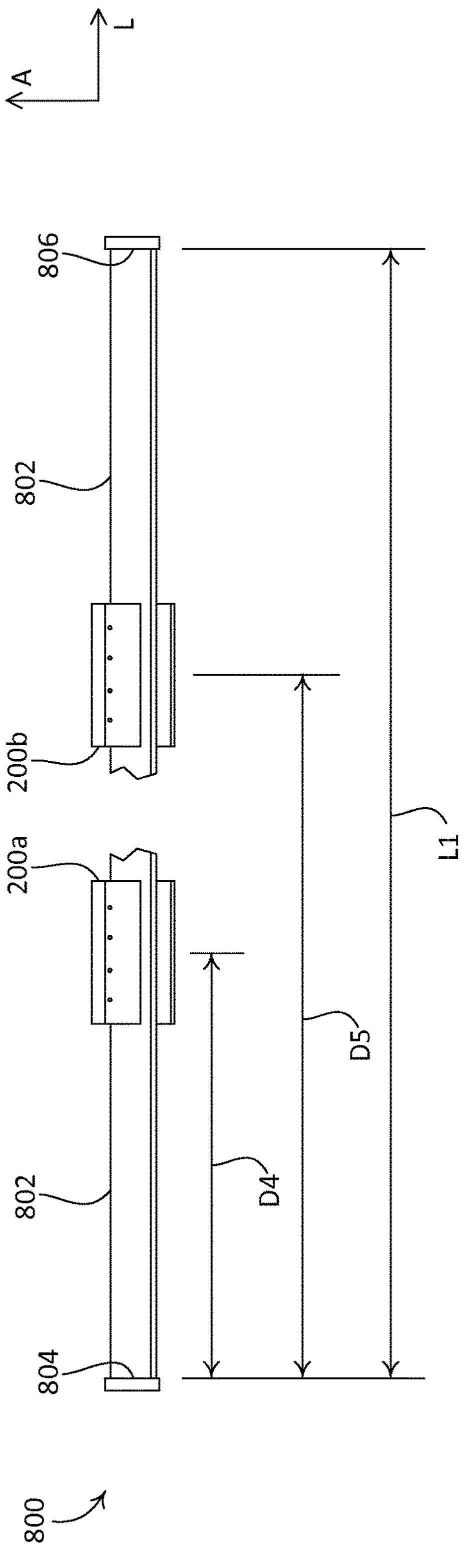
FIG. 5 is a bottom view of an example roller shade installation that includes a roller shade assembly and two impact-absorbing retention brackets.

FIG. 5 depicts an example roller shade installation 800 that includes a single roller shade assembly 802 and two retention brackets 200. The retention brackets 200 may be referred to as a first retention bracket 200*a* and a second retention bracket 200*b*. The roller shade assembly 802 defines a first end 804, and an opposed second end 806 that is spaced from the first end 804 along the longitudinal direction L, and has a length L1, for example, as defined from the first end 804 to the second end 806.

As shown, the first retention bracket 200*a* may be spaced at a first distance D4 from the first end 804, and the second retention bracket 200*b* may be spaced at a second distance D5 from the first end 804. In accordance with the example installation 800, the first distance D4 may be equal to one third of the length L1 of the roller shade assembly 802, and the second distance D5 may be equal to two thirds of the length L1. The roller shade assembly 802, in combination with the first and second retention brackets 200*a*, 200*b*, may be referred to as a roller shade retention system. It should be appreciated that the installation 800 is not limited to the illustrated configuration using retention brackets 200. For example, the installation 800 may alternatively include one, two, or more retention brackets made up of any combination of retention brackets 200, 400, or 600, and the retention brackets may be located in any combination of the same or different locations along the length L1 of the roller shade assembly 802.

Figure 6:
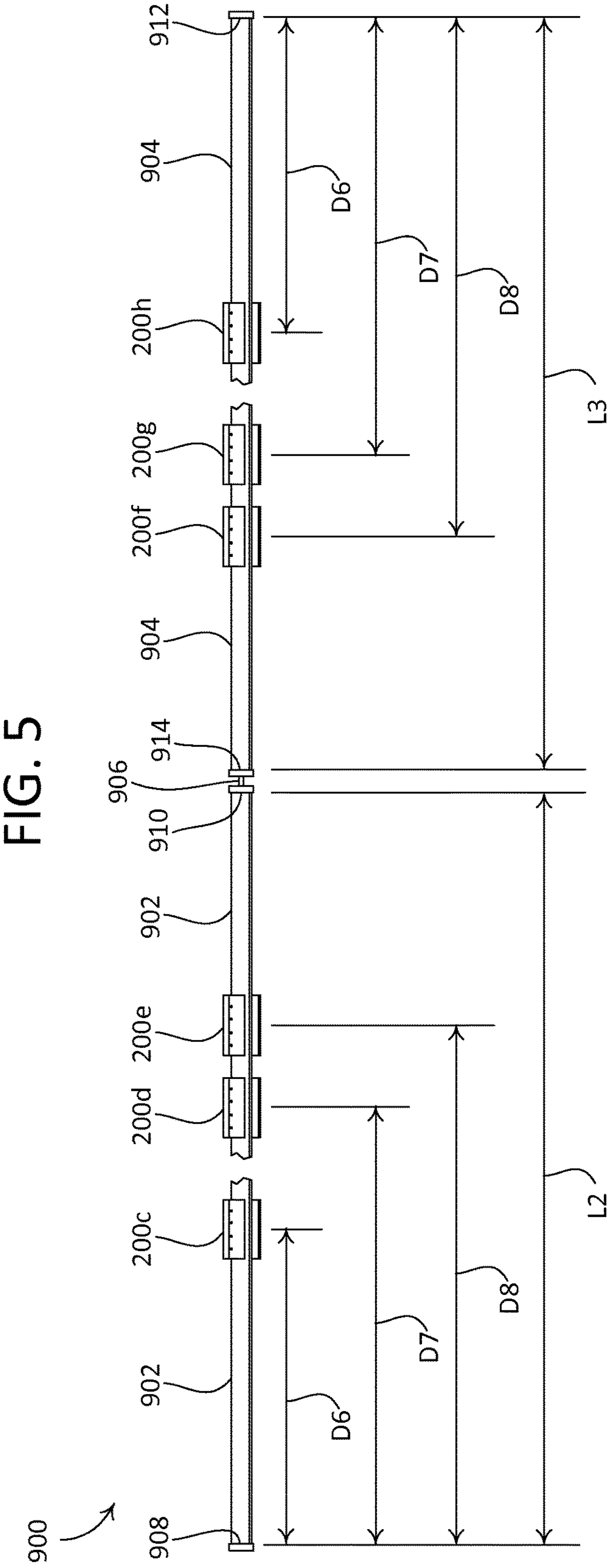
FIG. 6 is a bottom view of an example roller shade installation that includes two roller shade assemblies that are coupled to each other and six impact-absorbing retention brackets.

FIG. 6 depicts another example roller shade installation 900 that includes a first roller shade assembly 902, a second roller shade assembly 904 that is coupled to the first roller shade assembly 902, and six retention brackets 200. The retention brackets 200 may be referred to as a first retention bracket 200*c*, a second retention bracket 200*d*, a third retention bracket 200*e*, a fourth retention bracket 200*f*, a fifth retention bracket 200*g*, and a sixth retention bracket 200*h*. The first and second roller shade assemblies 902, 904 may be operatively coupled to each other, such that respective shade fabrics of the first and second roller shade assemblies 902, 904 may be raised and lowered simultaneously. For example, respective drive shafts of the first and second roller shade assemblies 902, 904 may be linked to one another via a coupling 906, or the first and second roller shade assemblies 902, 904 may share a common drive shaft. The first and second roller shade assemblies 902, 904 may be driven by a common motor drive unit or may be driven by discrete motor drive units (e.g., each of the first and second roller shade assemblies 902, 904 may be driven by a respective motor drive unit).

The first roller shade assembly 902 defines a first end 908, and an opposed second end 910 that is spaced from the first end 908 along the longitudinal direction L, and has a length L2, for example, as defined from the first end 908 to the second end 910. The second roller shade assembly 904 defines a first end 912, and an opposed second end 914 that is spaced from the first end 912 along the longitudinal direction L, and has a length L3, for example, as defined from the first end 912 to the second end 914. As shown, the length L2 of the first roller shade assembly 902 is equal to the length L3 of the second roller shade assembly 904. Alternatively, the length L2 of the first roller shade assembly 902 may different from the length L3 of the second roller shade assembly 904.

As shown, the first retention bracket 200*c* may be spaced at a first distance D6 from the first end 908 of the first roller shade assembly 902, the second retention bracket 200*d* may be spaced at a second distance D7 from the first end 908, and the third retention bracket 200*e* may be spaced at a third distance D8 from the first end 908. The fourth retention bracket 200*f* may be spaced at the first distance D6 from the first end 912 of the second roller shade assembly 904, the fifth retention bracket 200*g* may be spaced at the second distance D7 from the first end 912, and the sixth retention bracket 200*h* may be spaced at the third distance D8 from the first end 912.

In accordance with the example installation 900, the first distance D6 may be equal to one-third of the length L2 of the first roller shade assembly 902, and equal to one-third of the length L3 of the second roller shade assembly 904. The second distance D7 may be equal to two-thirds of the length L2 of the first roller shade assembly 902, and equal to two-thirds of the length L3 of the second roller shade assembly 904. The third distance D8 may be equal to three-quarters of the length L2 of the first roller shade assembly 902, and equal to three-quarters of the length L3 of the second roller shade assembly 904. It should be appreciated that the installation 900 is not limited to the illustrated configuration using retention brackets 200. For example, the installation 900 may alternatively include more or fewer retention brackets made up of any combination of retention brackets 200, 400, or 600, and the retention brackets may be located in any combination of the same or different locations along the lengths L2 and L3 of the first and second roller shade assemblies 902, 904, respectively.

FIGS. 7A-7E depict another example impact-absorbing retention bracket 1000. As shown, the retention bracket 1000 may be configured as a two-part retention bracket that includes a first bracket member 1002 and a second bracket member 1004. As shown, the second bracket member 1004 may be configured to be removably attachable to the first bracket member 1002.

The first bracket member 1002, for instance as shown, may include a rectangular-shaped plate 1006 that defines an upper end 1008, an opposed lower end 1010 that is spaced from the upper end 1008 along the transverse direction T, a first side 1012, and an opposed second side 1014 that is spaced from the first side 1012 along the longitudinal direction L. It should be appreciated that the plate 1006 is not limited to the illustrated rectangular geometry.

As shown, the plate 1006 may define a first flange 1016 that extends outward from the first side 1012 of the plate 1006, and a second flange 1018 that extends outward from the second side 1014 of the plate 1006. The first and second flanges 1016, 1018 may extend outward from the first and second sides 1012, 1014 of the plate 1006 along the lateral direction A. As shown, the first flange 1016 may extend along an entirety of the first side 1012 of the plate 1006, from the upper end 1008 to the lower end 1010, and the second flange 1018 may extend along an entirety of the second side 1014 of the plate 1006, from the upper end 1008 to the lower end 1010.

As shown, the first bracket member 1002 may further includes an upper arm 1020 that extends outward from the plate 1006. The upper arm 1020 may be configured to surround a first circumferential portion of a roller shade assembly 1102 (e.g., as shown in FIG. 7D). As shown, the upper arm 1020 may extend outward from the second side 1014 of the plate 1006 along the lateral direction A, and more specifically may extend outward from an upper portion of the second flange 1018, near the upper end 1008 of the plate 1006. The upper arm 1020 may define a free end 1022 that is spaced from the plate 1006 along the lateral direction A, and from the upper end 1008 of the plate 1006 along the transverse direction T. As shown, the upper arm 1020 may define an arc-shaped inner edge 1024 that may be referred to as a first inner edge of the retention bracket 1000. It should be appreciated that the upper arm 1020 is not limited to the illustrated geometry.

The second bracket member 1004, for instance as shown, may include a rectangular-shaped base 1026 that defines an upper end 1028, an opposed lower end 1030 that is spaced from the upper end 1028 along the transverse direction T, a first side 1032, and an opposed second side 1034 that is spaced from the first side 1032 along the longitudinal direction L. It should be appreciated that the base 1026 is not limited to the illustrated rectangular geometry.

As shown, the second bracket member 1004 may define a lower arm 1036 that extends outward from the base 1026. The lower arm 1036 may be configured to surround a second circumferential portion of the roller shade assembly 1102 (e.g., as shown in FIG. 7D). As shown, the lower arm 1036 may extend outward from the second side 1034 of the base 1026 along the lateral direction A. The lower arm 1036 may define a free end 1038 that is spaced from the base 1026 along the lateral direction A, and from the upper end 1028 of the base 1026 along the transverse direction T. As shown, the lower arm 1036 may define an arc-shaped inner edge 1040 that may be referred to as a second inner edge of the retention bracket 1000. It should be appreciated that the lower arm 1036 is not limited to the illustrated geometry.

The first and second bracket members 1002, 1004 may be configured such that the second bracket member 1004 may be removably attached to the first bracket member 1002. For example, the plate 1006 may define one or more openings, such as slots 1042 that extend therethrough along the lateral direction A, and the base 1026 may define one or more apertures 1044 that extend therethrough along the lateral direction A. As shown, the plate 1006 may define four slots 1042 and the base 1026 may define four corresponding apertures 1044. The slots 1042 may be elongate along the transverse direction T, may be transversely aligned with one another, and may be spaced apart from each other along the longitudinal direction L. As shown, the slots 1042 may be located closer to the lower end 1010 of the plate 1006 than to the upper end 1008. The apertures 1044 may be aligned with one another along the transverse direction T, and may be spaced apart from each other along the longitudinal direction L. As shown, the apertures 1044 may be defined near the upper end 1028 of the base 1026. It should be appreciated that the first and second bracket members 1002, 1004 are not limited to the illustrated number or locations of the slots 1042 and/or apertures 1044, and that one or both of the first and second bracket members 1002, 1004 may be alternatively configured with more or fewer openings in suitable locations, or may be configured to attach to each other in a different manner (e.g., with different fasteners or without fasteners).

The base 1026 of the second bracket member 1004 may be configured to be received by the plate 1006. For example, the first and second sides 1032, 1034 of the base 1026 may be spaced apart from each other along the longitudinal direction through a distance that is shorter than a distance from respective inner surfaces of the first and second flanges 1016, 1018 of the plate 1006. In this regard, the base 1026 may be configured to nest against the plate 1006, within the first and second flanges 1016, 1018.

The first and second bracket members 1002, 1004 may be attached to each other, for example, using fasteners (e.g., bolts 1046, screws, etc.) disposed in the slots 1042 and the apertures 1044. In accordance with the illustrated first and second bracket members 1002, 1004, the vertical positioning of the second bracket member 1004 relative to the first bracket member 1002 may be adjusted, for example by loosening and moving the bolts 1046 within the slots 1042.

This may enable a spacing between the lower arm 1036 and the shade material of a roller shade assembly about which the retention bracket 1000 is installed to be adjusted, for example to account for deflection along the length of the roller shade assembly. For example, the lower arm 1036 may be adjusted upward or downward relative to the upper arm 1020 to account for differing amounts of sag along the length of the roller shade assembly. In this regard, the second bracket member 1004 may be adjustable relative to the plate 1006 along the transverse direction T. In a shade installation that includes multiple retention brackets 1000, adjustability of the second bracket members 1004 may allow for uniform spacing between the inner edges 1040 of the lower arms 1036 and the shade material of the roller shade assembly to be maintained along the length of the roller shade assembly.

The retention bracket 1000 may be configured to be attached to structure, such as an architectural element of a building (e.g., a beam, a support, a truss, blocking, etc.). For example, as shown, the plate 1006 of the first bracket member 1002 may define a plurality of apertures 1048 that extend therethrough along the lateral direction A, such that the first bracket member 1002, and thus the retention bracket 1000, may be attached to structure with respective fasteners (e.g., screws, lag bolts, etc.). As shown, the plate 1006 defines four apertures 1048. It should be appreciated that the retention bracket 1000 is not limited to the illustrated number or locations of the apertures 1048, and that the retention bracket 1000 may be alternatively configured with more or fewer apertures 1048 in suitable locations, or may be configured to attach to structure in a different manner (e.g., with different fasteners or without fasteners).

As shown, the retention bracket 1000 may define a substantially uniform thickness TH4 throughout the first and second bracket members 1002, 1004. In this regard, the plate 1006, the upper arm 1020, the base 1026, and the lower arm 1036 may be configured with a uniform thickness. It should be appreciated that the retention bracket 1000 is not limited to having uniform thickness, and that the retention bracket 1000 may alternatively be configured with one or more sections of varying thickness. For example, the retention bracket 1000 may be configured such that the first bracket member 1002 defines a thickness that is different from a thickness of the second bracket member 1004. The first and second bracket members 1002, 1004 of the retention bracket 1000 may be made of any suitable material, such as metal (e.g., steel).

Figure 7A:
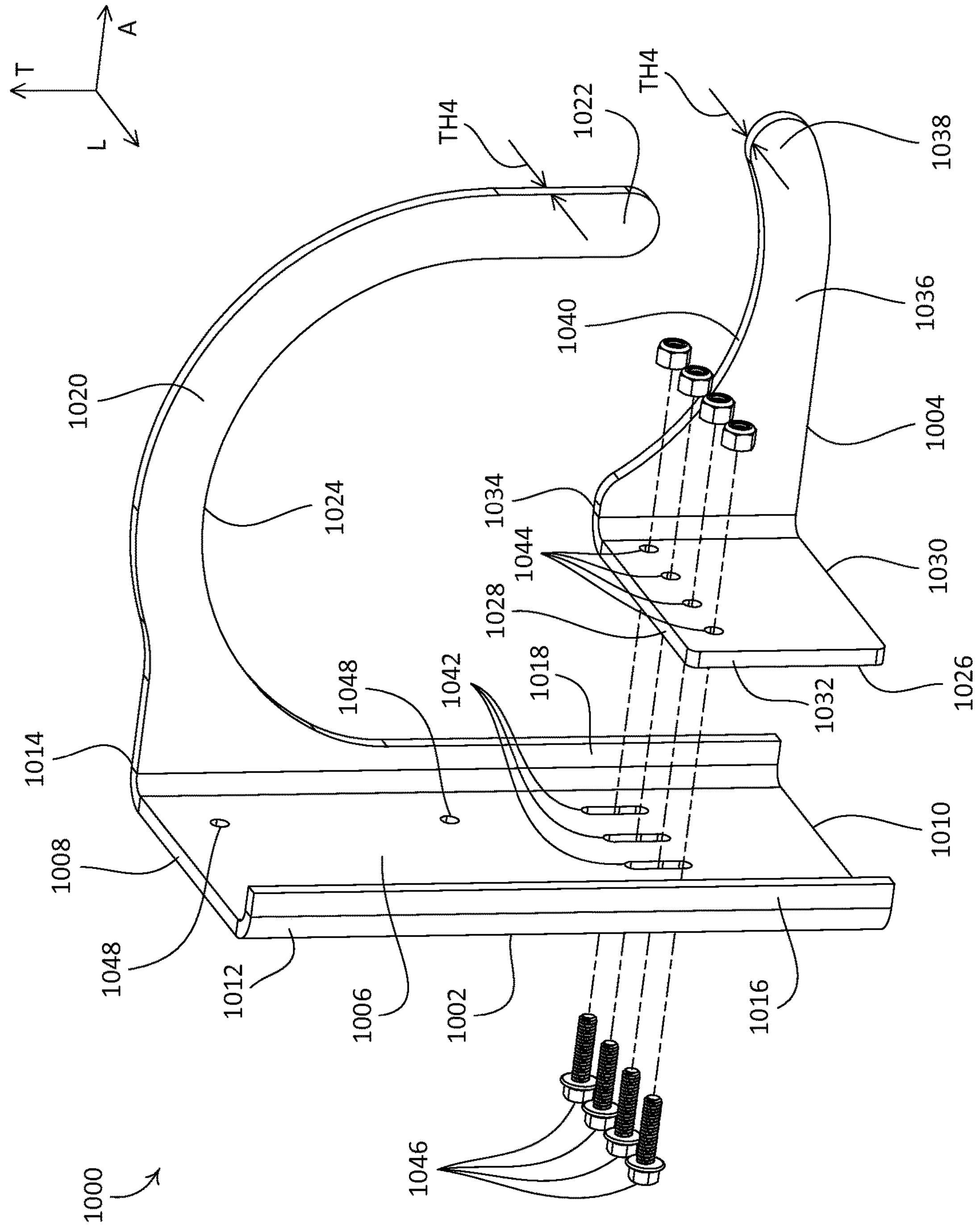
FIGS. 7A-7C are perspective views of another example impact-absorbing retention bracket.
Figure 7B:
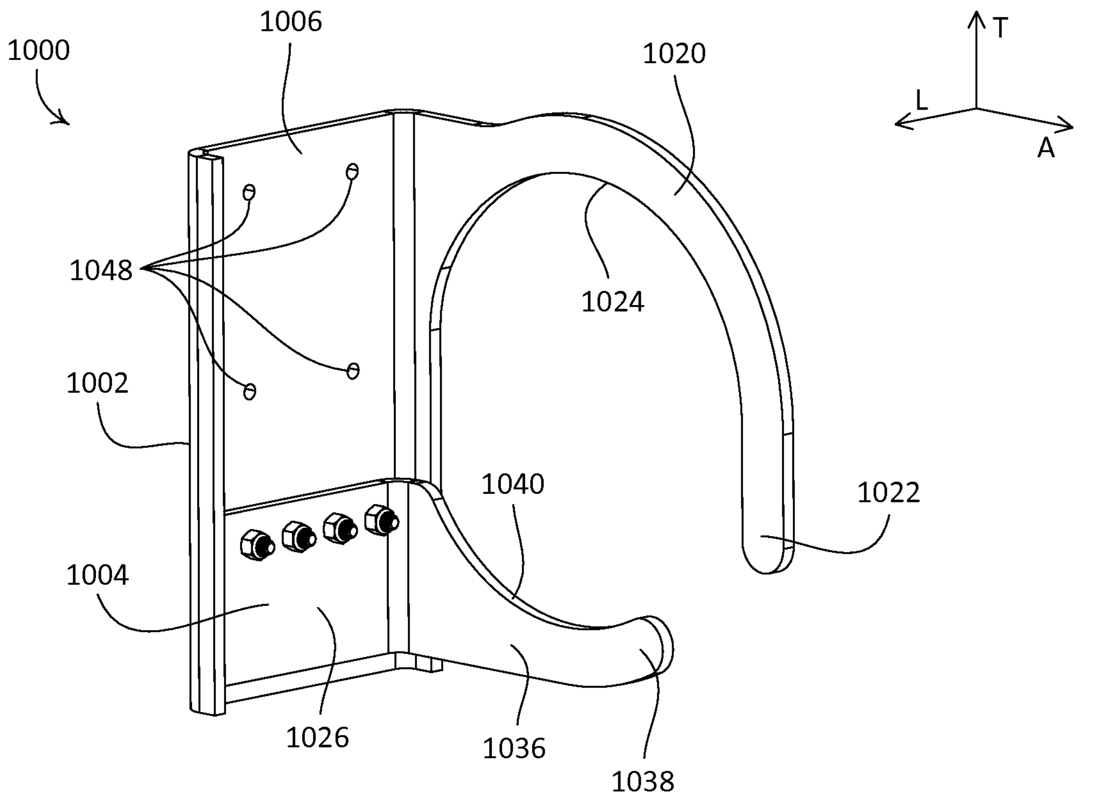
Figure 7C:
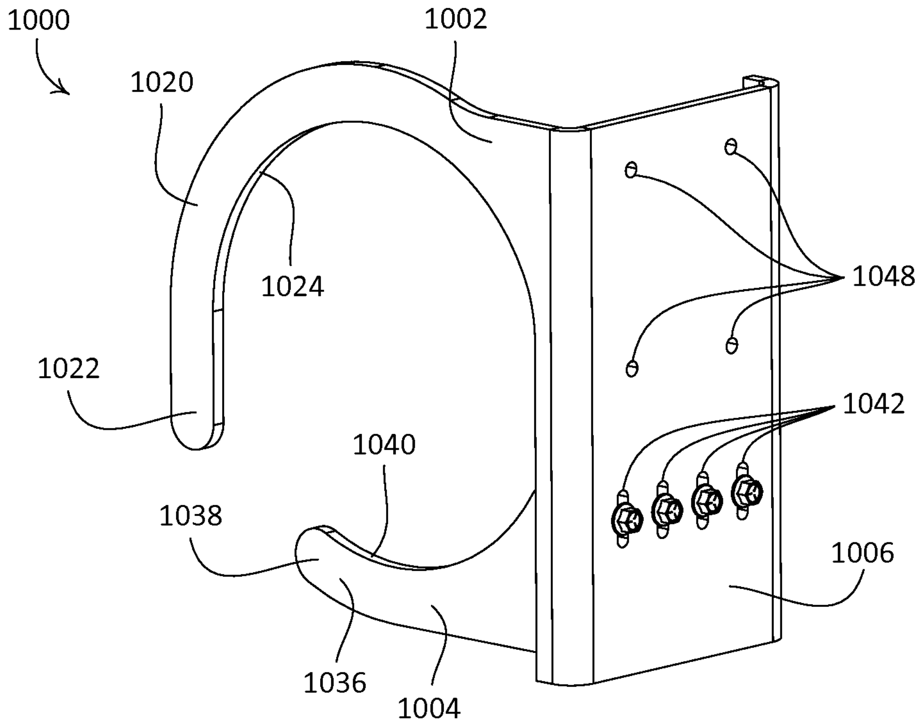

As illustrated in FIGS. 7B and 7C, when the second bracket member 1004 is attached to the first bracket member 1002, the upper arm 1020 and the lower arm 1036 may be disposed adjacent to one another relative to along the longitudinal direction L. However, it should be appreciated that the retention bracket 1000 is not limited to the illustrated configurations of the upper and lower arms 1020, 1036. For example, in accordance with an alternative configuration of the retention bracket 1000, the upper arm 1020 and the lower arm 1036 may be spaced apart from each other along the longitudinal direction L. It should further be appreciated that the upper and lower arms 1020, 1036 are not limited to the illustrated configurations in which the upper and lower arms 1020, 1036 extend along the lateral direction A in a straight fashion. For example, in accordance with an alternative configuration of the retention bracket 1000, one or both of the upper arm 1020 and the lower arm 1036 may define one or more angularly offset portions between the plate 1006 and the free end 1022, or between the base 1026 and the free end 1038, respectively.

Figure 7E:
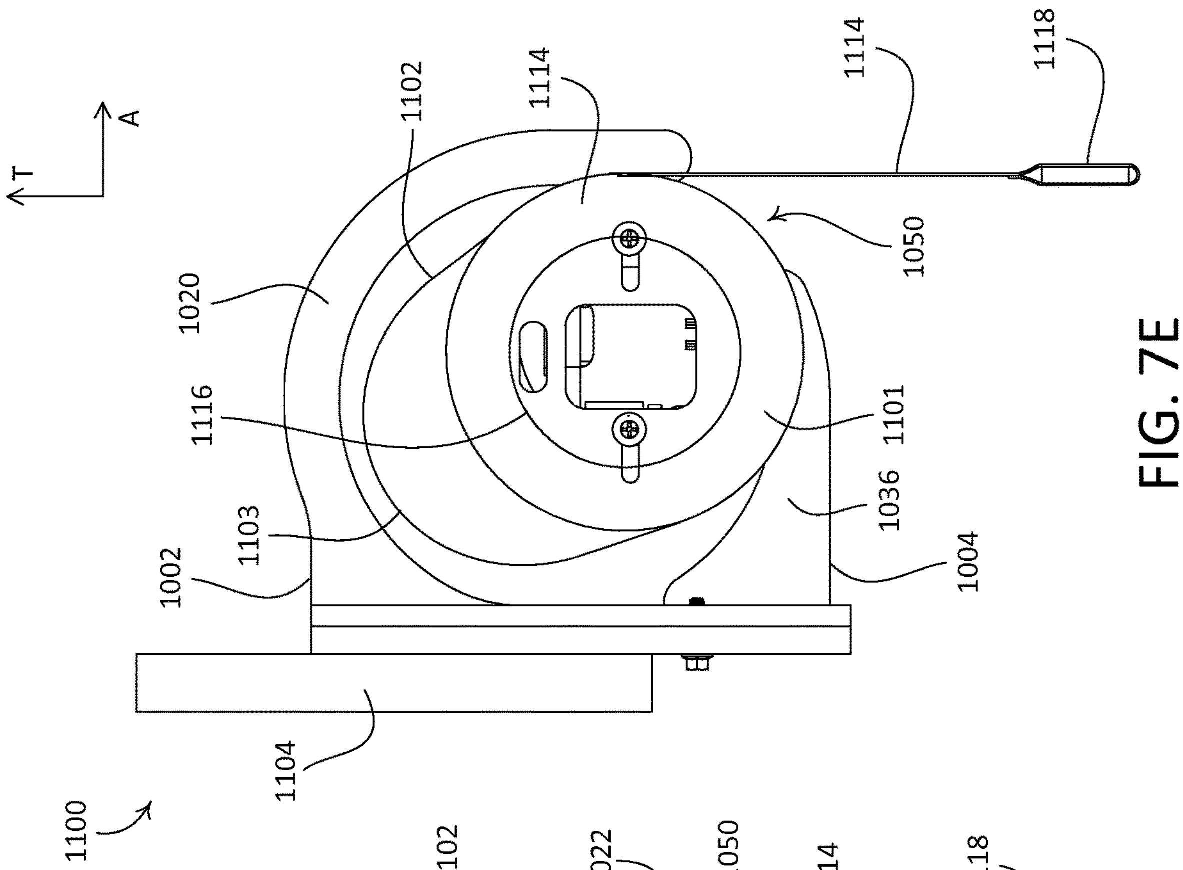
FIG. 7E is a simplified end view of the retention bracket and roller shade assembly installation shown in FIG. 7D, with the roller shade assembly detached from the mounted position.
Figure 7D:
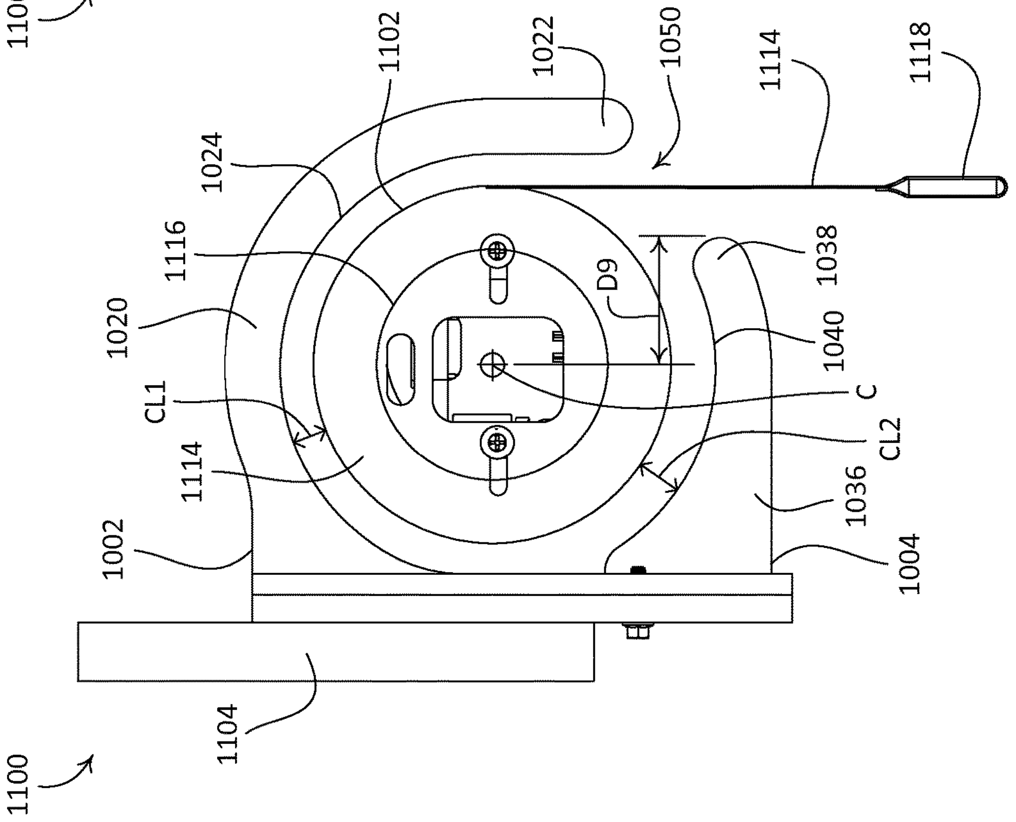
FIG. 7D is a simplified end view of an installation including a roller shade assembly and the retention bracket shown in FIGS. 7A-7C, with the roller shade assembly attached in a mounted position.

FIGS. 7D and 7E are simplified illustrations of an example roller shade installation 1100 that may include one or more retention brackets 1000. The roller shade installation 1100 may include a roller shade assembly 1102, two roller shade support brackets (not shown) that are disposed at opposed first and second ends of the roller shade assembly 1102, and four retention brackets 1000 (only one is visible). The roller shade installation 1100 may further include an enclosure (not shown). The retention brackets 1000 may be spaced apart from each other along the longitudinal direction L, along a length of the roller shade assembly 1102. The roller shade assembly 1102, in combination with the retention brackets 1000, may be referred to as a roller shade retention system.

The roller shade support brackets, the retention brackets 1000, and the enclosure may be attached to, and/or supported by, one or more structures and/or architectural elements. In accordance with the illustrated roller shade installation 1100, the roller shade support brackets, the retention brackets 1000, and the enclosure may be attached to a header 1104, for example using fasteners (e.g., screws, lag bolts, etc.). The roller shade assembly 1102 may be attached to, and supported by, the roller shade support brackets. In this regard, it may be said that the roller shade assembly 1102 is attached to the header 1104 (e.g., indirectly via the roller shade support brackets) in a mounted position.

The roller shade assembly 1102 may define opposed first and second ends 1101, 1103 that are spaced apart from each other along the longitudinal direction L. The first and second ends 1101, 1103 of the roller shade assembly 1102 may be attached to, and supported by, the roller shade support brackets. The roller shade assembly 1102 may include a covering material (e.g., a shade fabric 1114) that may be raised and lowered, for example, to cover an opening. The roller shade assembly 1102 may further include a roller tube

1116, to which an upper end of the shade fabric 1114 is attached. The roller tube 1116 may be driven by an electric motor drive unit (not shown) to raise and lower the shade fabric 1114. The roller shade assembly 1102 may further include a hembar 1118 that is attached to a lower end of the shade fabric 1114. The hembar 1118 may be weighted, such that the hembar 1118 causes the shade fabric 1114 to hang (e.g., vertically).

As shown, the retention bracket 1000 may be configured such that, when the retention bracket 1000 is attached to one or more structures and/or architectural elements (e.g., the header 1104), and the roller shade assembly 1102 is in the mounted position, the upper arm 1020 and the lower arm 1036 may at least partially enclose respective first and second circumferential portions of the roller shade assembly 1102. The upper arm 1020 may be configured such that a minimum clearance exists between the first inner edge 1024 and an outer circumference of the shade fabric 1114 when the shade fabric 1114 is in a raised position (e.g., with the shade fabric 1114 wound onto the roller tube 1116). For example, as shown, the upper arm 1020 may be configured such that a clearance CL1 of at least 0.375 inches exists between the first inner edge 1024 and the shade fabric 1114 when the shade fabric 1114 is in a raised position. In accordance with the illustrated configuration of the roller shade installation 1100, the second bracket member 1004 may be attached to the plate 1006 such that a clearance CL2 of at least 0.5 inches exists between the second inner edge 1040 and the shade fabric 1114 when the shade fabric 1114 is in the raised position. It should be appreciated that the retention bracket 1000 is not limited to the illustrated clearances CL1, CL2 between the first and second inner edges 1024, 1040, respectively, and the shade fabric 1114 when the shade fabric 1114 is in the raised position.

The retention bracket 1000 may be configured to at least partially surround a corresponding portion of the roller shade assembly 1102 such that the retention bracket 1000 does not interfere with operation of the roller shade assembly 1102. For example, the retention bracket 1000 may define an opening 1050 through which the shade fabric 1114 may be raised and lowered.

The opening 1050 may be defined by the upper arm 1020 and the lower arm 1036. For example, as shown, the opening 1050 may be defined by the free end 1022 of the upper arm 1020 and the free end 1038 of the lower arm 1036. The opening 1050 may be narrower than a diameter of the roller tube 1116, such that the roller tube 1116 will not fit through the opening 1050 when the shade fabric 1114 is completely unwound from the roller tube 1116. With continued reference to the opening 1050, the retention bracket 1000 may be configured such that, when the retention bracket 1000 is attached to one or more structures and/or architectural elements and the roller shade assembly 1102 is in the mounted position, the free end 1038 of the lower arm 1036 is spaced from a central axis C of the roller shade assembly 1102 by a distance D9 that is less than half of the diameter of the roller tube 1116 (as shown in FIG. 7D), such that the lower arm 1036 does not interfere with operation of the shade fabric 1114. Alternatively, the retention bracket 1000 may be configured such that a portion of the retention bracket 1000 makes contact with the shade fabric 1114, for example to guide the shade fabric 1114.

FIG. 7D depicts the roller shade assembly 1102 in the mounted position. FIG. 7E depicts an example rest position of the roller shade assembly 1102 after at least one of the first or second ends 1101, 1103 of the roller shade assembly 1102 has become detached from the mounted position. When the roller shade assembly 1102 becomes detached from the mounted position, it may begin to fall towards the opening 1050. As it falls, the roller shade assembly 1102 may make contact with one or more of the retention brackets 1000, thereby transferring an impact force to one or more of the retention brackets 1000.

The retention brackets 1000 may be configured to absorb corresponding portions of the impact force associated with detachment of the roller shade assembly 1102 from the mounted position, and to limit displacement of the detached roller shade assembly 1102 from the mounted position. In this regard, the retention brackets 1000 may be configured to retain the detached roller shade assembly 1102, such that the roller shade assembly 1102 does not fall far from the mounted position.

The retention brackets 1000 may be configured to remain substantially rigid upon absorbing corresponding portions of the impact force from the roller shade assembly 1102, such that the first and second bracket members 1002, 1004 exhibit little to no deflection upon absorbing corresponding portions of the impact force. Alternatively, the retention brackets 1000 may be configured to deflect upon absorbing corresponding portions of the impact force. For example, each retention bracket 1000 may define a deflectable portion. The deflectable portion may correspond to one or more portions of the first bracket member 1002 and/or one or more portions of the second bracket member 1004.

The retention bracket 1000 may be configured to retain at least a portion of the roller shade assembly 1102, such as the roller tube 1116, after absorbing a respective portion of the impact force associated with detachment of the roller shade assembly 1102. For example, upon absorbing a corresponding portion of the impact force, the retention bracket 1000 may deform plastically under a load associated with the impact force. The retention bracket 1000 may be configured to absorb the load such that expansion of the opening 1050 is limited, for example, such that the opening 1050 does not expand beyond a distance equivalent to the diameter of the roller tube 1116. Stated differently, the retention bracket 1000 may be configured to absorb the load such that the spacing from the free end 1022 of the upper arm 1020 to the free end 1038 of the lower arm 1036 does not expand beyond a distance equivalent to the diameter of the roller tube 1116. In this regard, the retention bracket 1000 may be configured to deflect during absorption of a corresponding portion of the impact force, such that the roller shade assembly 1102 (e.g., the roller tube 1116) does not pass through the opening 1050.

The retention bracket 1000 may be configured to support a static weight of the roller shade assembly 1102 without deflecting, such that one or more retention brackets 1000 may retain the roller shade assembly 1102 if one or more of the retention brackets 1000 deforms unexpectedly upon absorbing a corresponding portion of the impact load. For example, if a first one of the retention brackets 1000 absorbs an unexpectedly large portion of the impact force that causes the first retention bracket 1000 to deform such that the opening 1050 of the first retention bracket 1000 expands beyond a distance equivalent to the diameter of the roller tube 1116, thereby allowing the roller tube 1116 to pass through the respective opening 1050, one or more other retention brackets 1000 may absorb a remaining portion of the impact force, with minimal or no resulting deflection. Each retention bracket 1000 may thus support, and thereby retain, the roller shade assembly 1102. In this regard, the retention brackets 1000 may be configured to deflect during absorption of the corresponding portions of the impact force, such that the width of at least one of the respective openings 1050 defined by the retention brackets 1000 does not expand beyond a distance that is equivalent to a diameter of the roller tube 1116.

Figure 8:
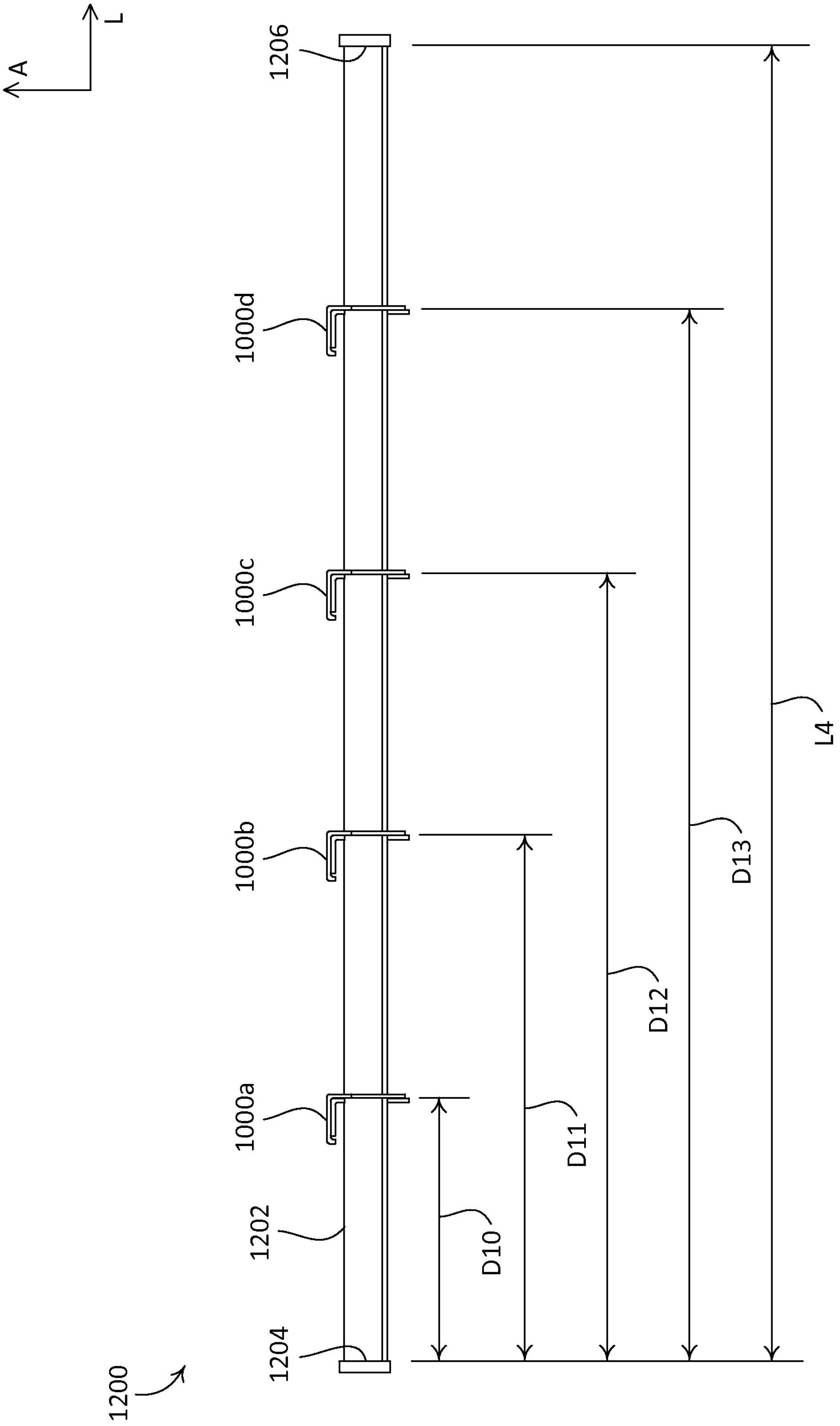
FIG. 8 is a top view of an example roller shade installation that includes a roller shade assembly and four impact-absorbing retention brackets.

FIG. 8 depicts an example roller shade installation 1200 that includes a single roller shade assembly 1202 and four retention brackets 1000. The retention brackets 1000 may be referred to as a first retention bracket 1000*a*, a second retention bracket 1000*b*, a third retention bracket 1000*c*, and a fourth retention bracket 1000*d*. The roller shade assembly 1202 may define a first end 1204 and an opposed second end 1206 that is spaced from the first end 1204 along the longitudinal direction L, and may have a length L4, for example, as defined from the first end 1204 to the second end 1206.

As shown, the first retention bracket 1000*a* may be spaced at a first distance D10 from the first end 1204, the second retention bracket 1000*b* may be spaced at a second distance D11 from the first end 1204, the third retention bracket 1000*c* may be spaced at a third distance D12 from the first end 1204, and the fourth retention bracket 1000*d* may be spaced at a fourth distance D13 from the first end 1204. In accordance with the example installation 1200, the first distance D10 may be equal to one fifth of the length L4 of the roller shade assembly 1202, the second distance D11 may be equal to two fifths of the length L4, the third distance D12 may be equal to three fifths of the length L4, and the fourth distance D13 may be equal to four fifths of the length L4. The roller shade assembly 1202, in combination with the first, second, third, and fourth retention brackets 1000*a*, 1000*b*, 1000*c*, and 1000*d* may be referred to as a roller shade retention system. It should be appreciated that the installation 1200 is not limited to the illustrated configuration using retention brackets 1000. For example, the installation 1200 may alternatively include more or fewer retention brackets 1000, and the retention brackets 1000 may be located in any combination of the same or different locations along the length L4 of the roller shade assembly 1202.

FIGS. 9A-9E depict another example impact-absorbing retention bracket 1300. As shown, the retention bracket 1300 may be configured as a two-part retention bracket that includes a first bracket member 1302 and a second bracket member 1304. As shown, the second bracket member 1304 may be configured to be removably attachable to the first bracket member 1302.

The first bracket member 1302, for instance as shown, may include a rectangular-shaped plate 1306 that defines an upper end 1308, an opposed lower end 1310 that is spaced from the upper end 1308 along the transverse direction T, a first side 1312, and an opposed second side 1314 that is spaced from the first side 1312 along the longitudinal direction L. It should be appreciated that the plate 1306 is not limited to the illustrated rectangular geometry.

As shown, the first bracket member 1302 may further includes an upper arm 1316 that extends outward from the plate 1306. The upper arm 1316 may be configured to surround a first circumferential portion of a roller shade assembly 1402 (e.g., as shown in FIG. 9D). As shown, the upper arm 1316 may extend outward from the second side 1314 of the plate 1306 along the lateral direction A, near the upper end 1308 of the plate 1306. The upper arm 1316 may define a free end 1318 that is spaced from the plate 1306 along the lateral direction A, and from the upper end 1308 of the plate 1306 along the transverse direction T. As shown, the upper arm 1316 may define an arc-shaped inner edge 1320 that may be referred to as a first inner edge of the retention bracket 1300. It should be appreciated that the upper arm 1316 is not limited to the illustrated geometry.

The second bracket member 1304, for instance as shown, may include a plate-shaped body 1322 that extends from a first end 1324 to an opposed second end 1326. The first end 1324 may be configured as a fixed end relative to the first bracket member 1302, and the second end 1326 may be configured as a free end 1328. As shown, the body 1322 of the second bracket member 1304 may define a lower arm 1330. The lower arm 1330 may be configured to surround a second circumferential portion of the roller shade assembly 1402 (e.g., as shown in FIG. 9D). As shown, the lower arm 1330 may define an arc-shaped inner edge 1332 that may be referred to as a second inner edge of the retention bracket 1300. It should be appreciated that the lower arm 1330 is not limited to the illustrated geometry.

The first and second bracket members 1302, 1304 may be configured such that the second bracket member 1304 may be removably attached to the first bracket member 1302. For example, as shown, the first bracket member 1302 may define one or more openings, such as apertures 1334, that extend therethrough along the longitudinal direction L, and the second bracket member 1304 may define one or more apertures 1336 that extend therethrough along the longitudinal direction L. As shown, the first bracket member 1302 may define three apertures 1334 that may extend through the upper arm 1316 near the free end 1318, and the second bracket member 1304 may define three corresponding apertures 1336 that may extend through the body 1322 near the first end 1324. The first and second bracket members 1302, 1304 may be attached to each other, for example, using fasteners (e.g., bolts 1338, screws, etc.) disposed in the apertures 1334 and 1336. In this regard, the second bracket member 1304 may be configured to be attached to the free end 1318 of the upper arm 1316. It should be appreciated that the first and second bracket members 1302, 1304 are not limited to the illustrated number or locations of the apertures 1334 and/or the apertures 1336, and that one or both of the first and second bracket members 1302, 1304 may be alternatively configured with more or fewer openings in suitable locations, or may be configured to attach to each other in a different manner (e.g., with different fasteners or without fasteners).

The retention bracket 1300 may be configured to be attached to structure, such as an architectural element of a building (e.g., a beam, a support, a truss, blocking, etc.). For example, as shown, the plate 1306 of the first bracket member 1302 may define a plurality of apertures 1340 that extend therethrough along the lateral direction A, such that the first bracket member 1302, and thus the retention bracket 1300, may be attached to structure with respective fasteners (e.g., screws, lag bolts, etc.). As shown, the plate 1306 may define four apertures 1340. It should be appreciated that the retention bracket 1300 is not limited to the illustrated number or locations of the apertures 1340, and that the retention bracket 1300 may be alternatively configured with more or fewer apertures 1340 in suitable locations, or may be configured to attach to structure in a different manner (e.g., with different fasteners or without fasteners).

As shown, the retention bracket 1300 may define a substantially uniform thickness TH5 throughout the first and second bracket members 1302, 1304. In this regard, the plate 1306, the upper arm 1316, and the body 1322 may be configured with a uniform thickness. It should be appreciated that the retention bracket 1300 is not limited to having uniform thickness, and that the retention bracket 1300 may alternatively be configured with one or more sections of varying thickness. For example, the retention bracket 1300 may be configured such that the first bracket member 1302 defines a thickness that is different from a thickness of the second bracket member 1304. The first and second bracket members 1302, 1304 of the retention bracket 1000 may be made of any suitable material, such as metal (e.g., steel).

Figure 9A:
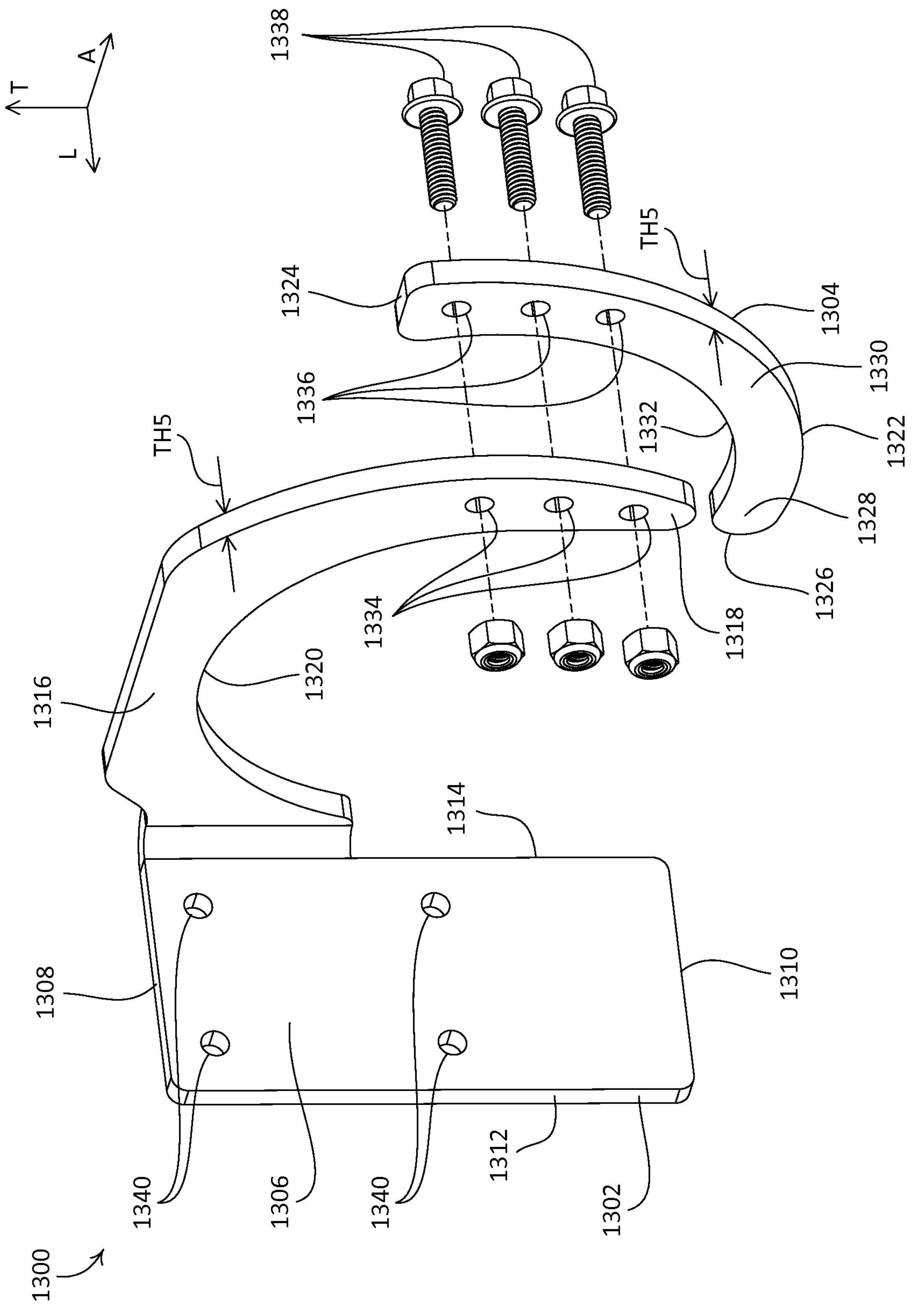
FIGS. 9A-9C are perspective views of another example impact-absorbing retention bracket.
Figure 9B:
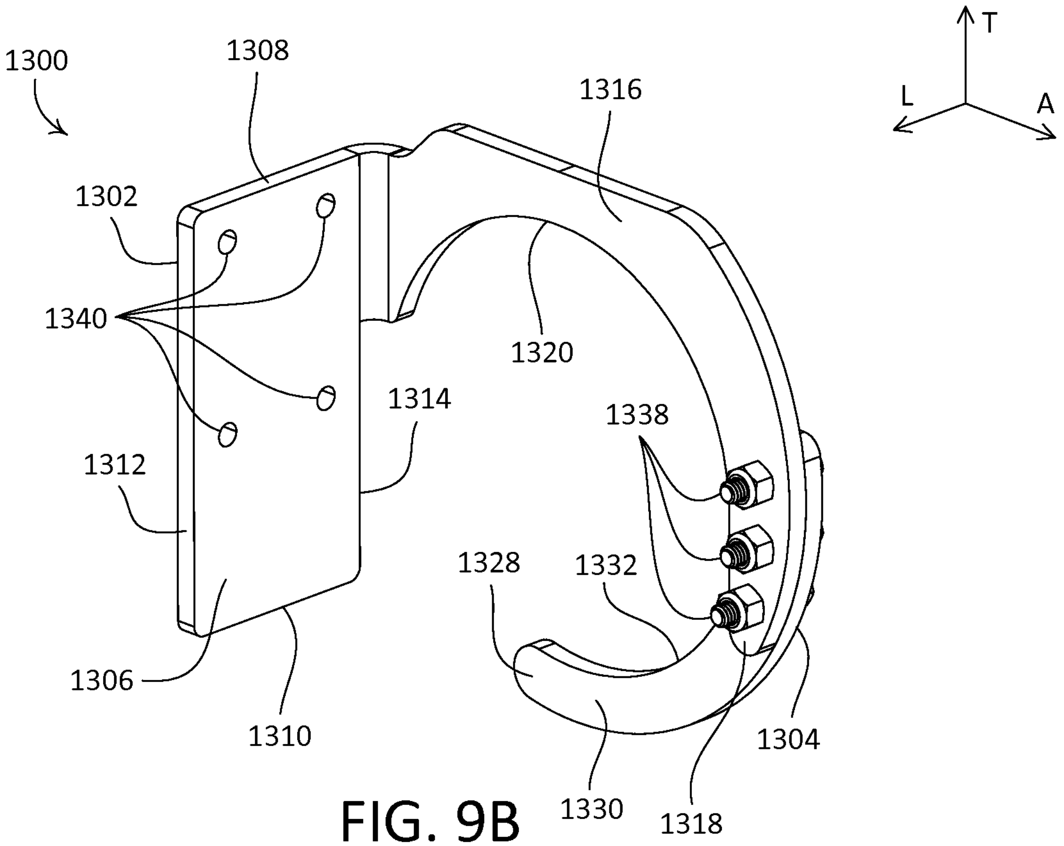
Figure 9C:
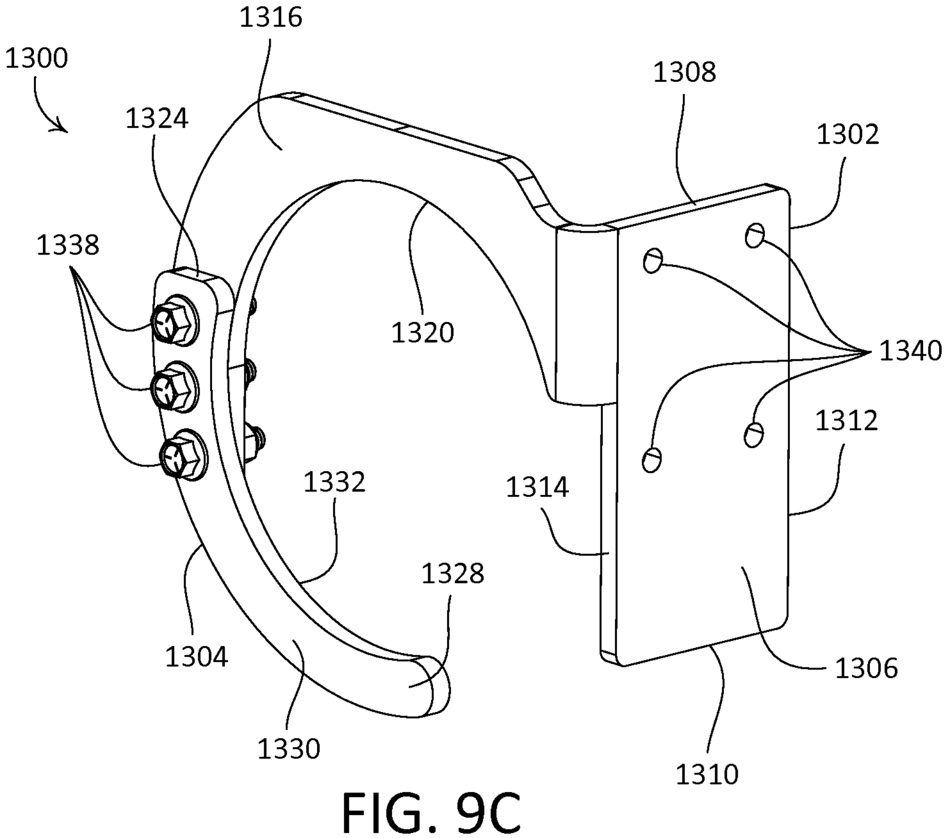

As illustrated in FIGS. 9B and 9C, when the second bracket member 1304 is attached to the first bracket member 1302, the upper arm 1316 and the lower arm 1330 may be disposed adjacent to one another relative to along the longitudinal direction L. However, it should be appreciated that the retention bracket 1300 is not limited to the illustrated configurations of the upper and lower arms 1316, 1330. For example, the upper and lower arms 1316, 1330 are not limited to the illustrated configurations in which the upper and lower arms 1316, 1330 extend along the lateral direction A in a straight fashion. For example, in accordance with an alternative configuration of the retention bracket 1300, the upper arm 1316 may define one or more angularly offset portions between the plate 1306 and the free end 1318, and/or the body 1322 may define one or more angularly offset portions.

Figure 9E:
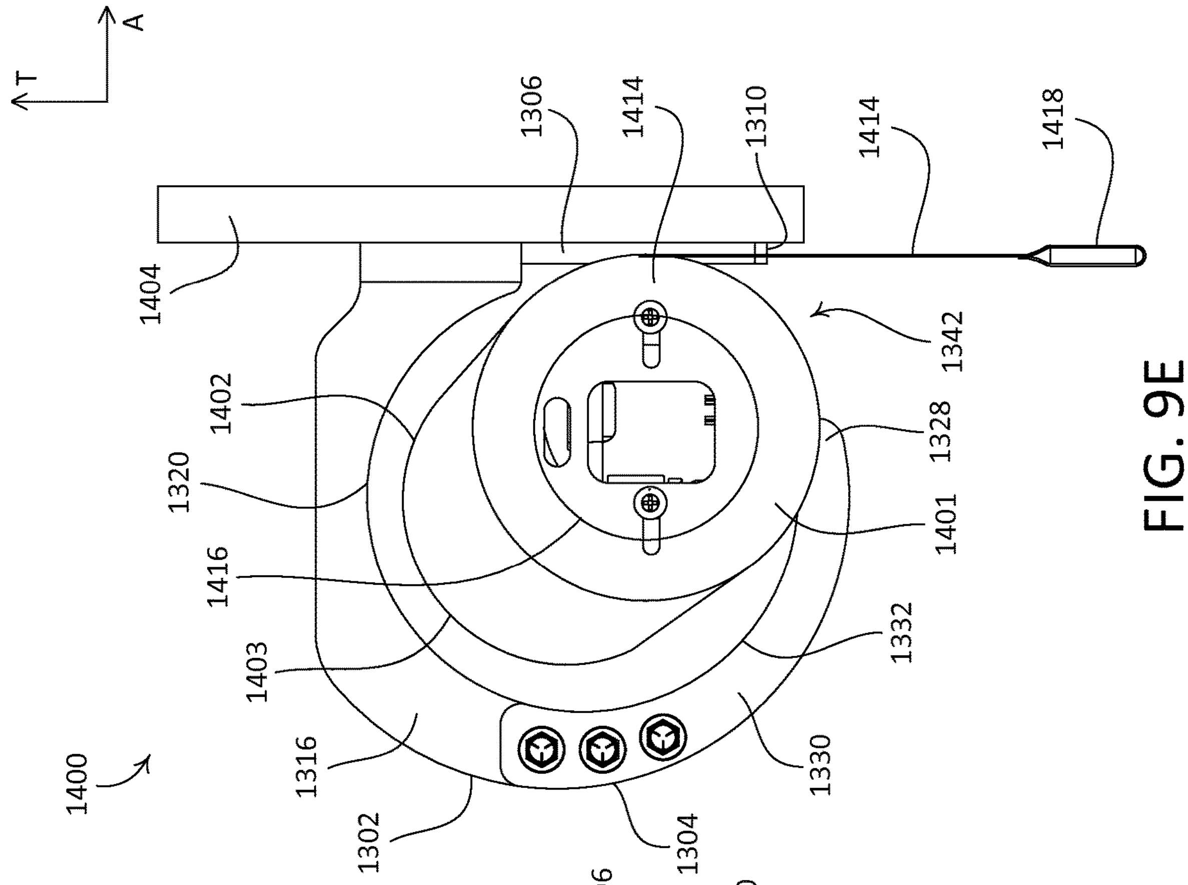
FIG. 9E is a simplified end view of the retention bracket and roller shade assembly installation shown in FIG. 9D, with the roller shade assembly detached from the mounted position.
Figure 9D:
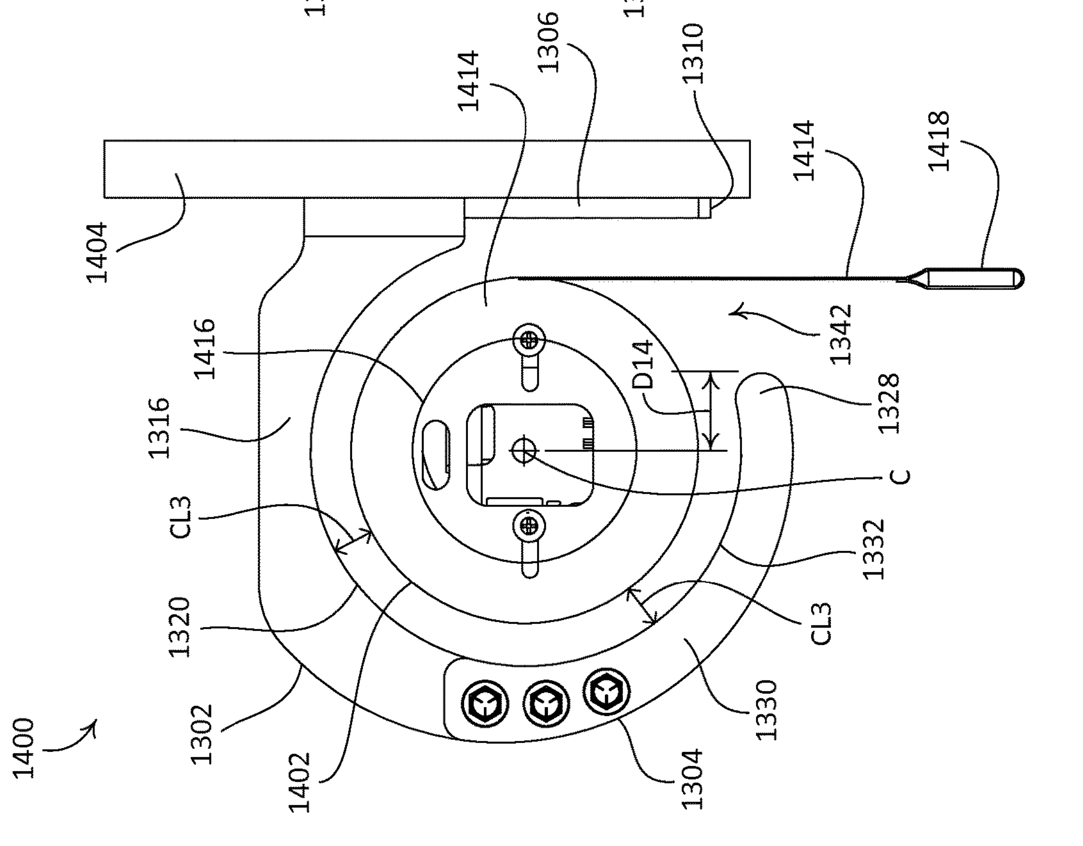
FIG. 9D is a simplified end view of an installation including a roller shade assembly and the retention bracket shown in FIGS. 9A-9C, with the roller shade assembly attached in a mounted position.

FIGS. 9D and 9E are simplified illustrations of an example roller shade installation 1400 that may include one or more retention brackets 1300. The roller shade installation 1400 may include a roller shade assembly 1402, two roller shade support brackets (not shown) that are disposed at opposed first and second ends of the roller shade assembly 1402, and three retention brackets 1300 (only one is visible). The roller shade installation 1400 may further include an enclosure (not shown). The retention brackets 1300 may be spaced apart from each other along the longitudinal direction L, along a length of the roller shade assembly 1402. The roller shade assembly 1402, in combination with the retention brackets 1300, may be referred to as a roller shade retention system.

The roller shade support brackets, the retention brackets 1300, and the enclosure may be attached to, and/or supported by, one or more structures and/or architectural elements. In accordance with the illustrated roller shade installation 1400, the roller shade support brackets, the retention brackets 1300, and the enclosure may be attached to a header 1404, for example using fasteners (e.g., screws, lag bolts, etc.). The roller shade assembly 1402 may be attached to, and supported by, the roller shade support brackets. In this regard, it may be said that the roller shade assembly 1402 is attached to the header 1404 (e.g., indirectly via the roller shade support brackets) in a mounted position.

The roller shade assembly 1402 may define opposed first and second ends 1401, 1403 that are spaced apart from each other along the longitudinal direction L. The first and second ends 1401, 1403 of the roller shade assembly 1402 may be attached to, and supported by, the roller shade support brackets. The roller shade assembly 1402 may include a covering material (e.g., a shade fabric 1414) that may be raised and lowered, for example, to cover an opening. The roller shade assembly 1402 may further include a roller tube 1416, to which an upper end of the shade fabric 1414 is attached. The roller tube 1416 may be driven by an electric motor drive unit (not shown) to raise and lower the shade fabric 1414. The roller shade assembly 1402 may further include a hembar 1418 that is attached to a lower end of the shade fabric 1414. The hembar 1418 may be weighted, such that the hembar 1418 causes the shade fabric 1414 to hang (e.g., vertically).

As shown, the retention bracket 1300 may be configured such that, when the retention bracket 1300 is attached to one or more structures and/or architectural elements (e.g., the header 1404), and the roller shade assembly 1402 is in the mounted position, the upper arm 1316 and the lower arm 1330 may at least partially enclose respective first and second circumferential portions of the roller shade assembly 1402. The upper arm 1316 and/or the lower arm 1330 may be configured such that a minimum clearance exists between the first inner edge 1320 and/or the second inner edge 1332 and an outer circumference of the shade fabric 1414 when the shade fabric 1414 is in a raised position (e.g., with the shade fabric 1414 wound onto the roller tube 1416). For example, as shown, the upper and lower arms 1316, 1330 may be configured such that a clearance CL3 of at least 0.25 inches exists between the first and second inner edges 1320 and 1332, respectively, and the shade fabric 1414 when the shade fabric 1414 is in the raised position. It should be appreciated that the retention bracket 1300 is not limited to the illustrated clearance CL3 between the first and second inner edges 1320, 1332, respectively, and the shade fabric 1114 when the shade fabric 1114 is in the raised position.

The retention bracket 1300 may be configured to at least partially surround a corresponding portion of the roller shade assembly 1402 such that the retention bracket 1300 does not interfere with operation of the roller shade assembly 1402. For example, the retention bracket 1300 may define an opening 1342 through which the shade fabric 1414 may be raised and lowered.

The opening 1342 may be defined by the lower arm 1330 and the plate 1306. For example, as shown, the opening 1342 may be defined by the free end 1328 of the lower arm 1330 and the lower end 1310 of the plate 1306. The opening 1342 may be narrower than a diameter of the roller tube 1416, such that the roller tube 1416 will not fit through the opening 1342 when the shade fabric 1414 is completely unwound from the roller tube 1416. With continued reference to the opening 1342, the retention bracket 1300 may be configured such that, when the retention bracket 1300 is attached to one or more structures and/or architectural elements and the roller shade assembly 1402 is in the mounted position, the free end 1328 of the lower arm 1330 is spaced from a central axis C of the roller shade assembly 1402 by a distance D14 that is less than half of the diameter of the roller tube 1416 (as shown in FIG. 9D), such that the lower arm 1330 does not interfere with operation of the shade fabric 1414. Alternatively, the retention bracket 1300 may be configured such that a portion of the retention bracket 1300 makes contact with the shade fabric 1414, for example to guide the shade fabric 1414.

FIG. 9D depicts the roller shade assembly 1402 in the mounted position. FIG. 9E depicts an example rest position of the roller shade assembly 1402 after at least one of the first or second ends 1401, 1403 of the roller shade assembly 1402 has become detached from the mounted position. When the roller shade assembly 1402 becomes detached from the mounted position, it may begin to fall towards the opening 1342. As it falls, the roller shade assembly 1402 may make contact with one or more of the retention brackets 1300, thereby transferring an impact force to one or more of the retention brackets 1300.

The retention brackets 1300 may be configured to absorb corresponding portions of the impact force associated with detachment of the roller shade assembly 1402 from the mounted position, and to limit displacement of the detached roller shade assembly 1402 from the mounted position. In this regard, the retention brackets 1300 may be configured to retain the detached roller shade assembly 1402, such that the roller shade assembly 1402 does not fall far from the mounted position.

The retention brackets 1300 may be configured to remain substantially rigid upon absorbing corresponding portions of the impact force from the roller shade assembly 1402, such that the first and second bracket members 1302, 1304 exhibit little to no deflection upon absorbing corresponding portions of the impact force. Alternatively, the retention brackets 1300 may be configured to deflect upon absorbing corresponding portions of the impact force. For example, each retention bracket 1300 may define a deflectable portion. The deflectable portion may correspond to one or more portions of the first bracket member 1302 and/or one or more portions of the second bracket member 1304.

The retention bracket 1300 may be configured to retain at least a portion of the roller shade assembly 1402, such as the roller tube 1416, after absorbing a respective portion of the impact force associated with detachment of the roller shade assembly 1402. For example, upon absorbing a corresponding portion of the impact force, the retention bracket 1300 may deform plastically under a load associated with the impact force. The retention bracket 1300 may be configured to absorb the load such that expansion of the opening 1342 is limited, for example, such that the opening 1342 does not expand beyond a distance equivalent to the diameter of the roller tube 1416. Stated differently, the retention bracket 1300 may be configured to absorb the load such that the spacing from the free end 1328 of the lower arm 1330 to the lower end 1310 of the plate 1306 does not expand beyond a distance equivalent to the diameter of the roller tube 1416. In this regard, the retention bracket 1300 may be configured to deflect during absorption of a corresponding portion of the impact force, such that the roller shade assembly 1402 (e.g., the roller tube 1416) does not pass through the opening 1342.

The retention bracket 1300 may be configured to support a static weight of the roller shade assembly 1402 without deflecting, such that one or more retention brackets 1300 may retain the roller shade assembly 1402 if one or more of the retention brackets 1300 deforms unexpectedly upon absorbing a corresponding portion of the impact load. For example, if a first one of the retention brackets 1300 absorbs an unexpectedly large portion of the impact force that causes the first retention bracket 1300 to deform such that the opening 1342 of the first retention bracket 1300 expands beyond a distance equivalent to the diameter of the roller tube 1416, thereby allowing the roller tube 1416 to pass through the respective opening 1342, one or more other retention brackets 1300 may absorb a remaining portion of the impact force, with minimal or no resulting deflection. Each retention bracket 1300 may thus support, and thereby retain, the roller shade assembly 1402. In this regard, the retention brackets 1300 may be configured to deflect during absorption of the corresponding portions of the impact force, such that the width of at least one of the respective openings 1342 defined by the retention brackets 1300 does not expand beyond a distance that is equivalent to a diameter of the roller tube 1416.

Figure 10:
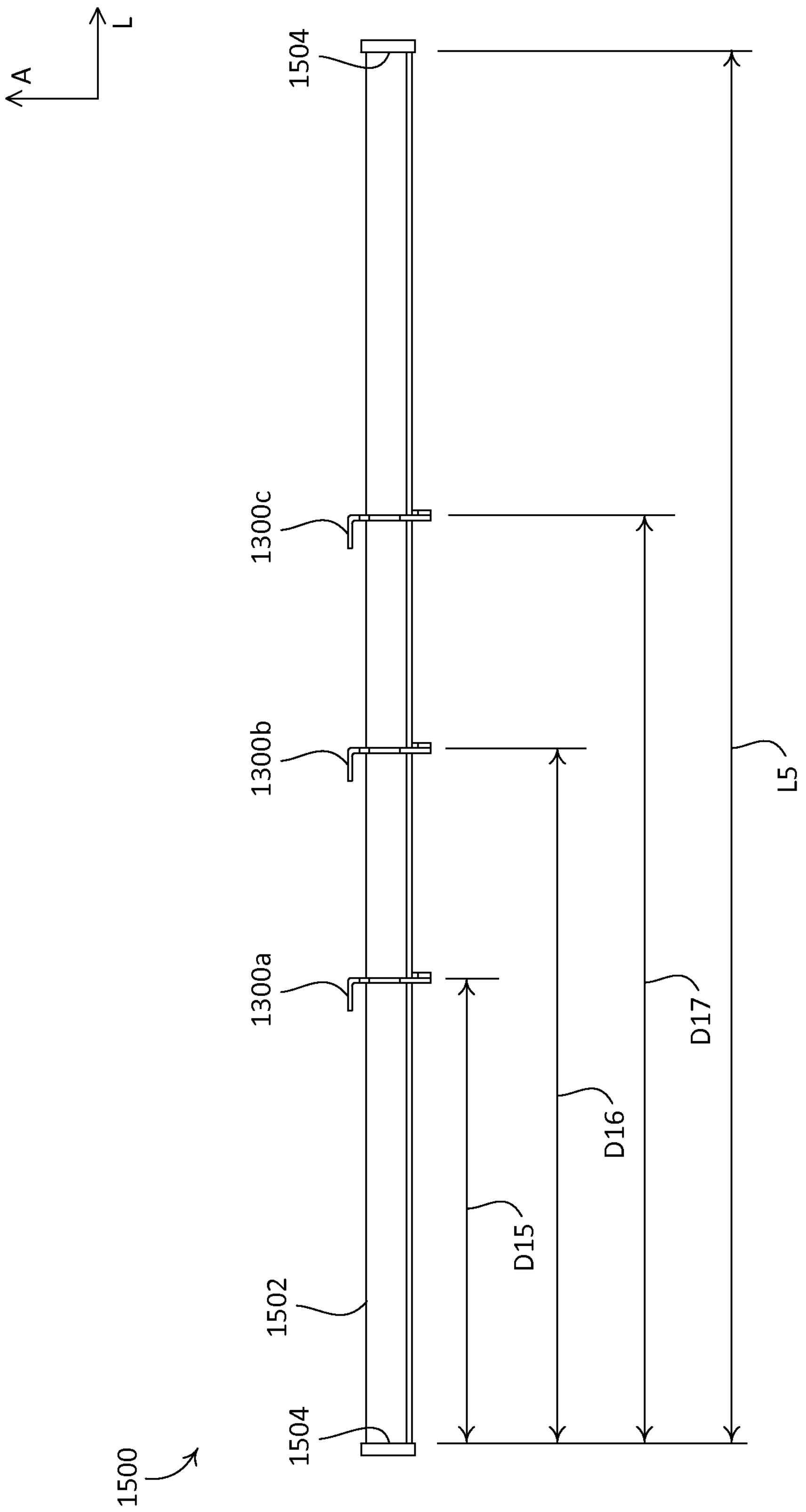
FIG. 10 is a top view of an example roller shade installation that includes a roller shade assembly and three impact-absorbing retention brackets.

FIG. 10 depicts an example roller shade installation 1500 that includes a single roller shade assembly 1502 and three retention brackets 1300. The retention brackets 1300 may be referred to as a first retention bracket 1300*a*, a second retention bracket 1300*b*, and a third retention bracket 1300*c*. The roller shade assembly 1502 may define a first end 1504 and an opposed second end 1506 that is spaced from the first end 1504 along the longitudinal direction L, and may have a length L5, for example, as defined from the first end 1504 to the second end 1506.

As shown, the first retention bracket 1300*a* may be spaced at a first distance D15 from the first end 1504, the second retention bracket 1300*b* may be spaced at a second distance D16 from the first end 1504, and the third retention bracket 1300*c* may be spaced at a third distance D17 from the first end 1504. In accordance with the example installation 1500, the first distance D15 may be equal to one third of the length L5 of the roller shade assembly 1502, the second distance D16 may be equal to one half of the length L5, and the third distance D17 may be equal to two thirds of the length L5. The roller shade assembly 1502, in combination with the first, second, and third retention brackets 1300*a*, 1300*b*, and 1300*c* may be referred to as a roller shade retention system. It should be appreciated that the installation 1500 is not limited to the illustrated configuration using retention brackets 1300. For example, the installation 1500 may alternatively include more or fewer retention brackets 1300, and the retention brackets 1300 may be located in any combination of the same or different locations along the length L5 of the roller shade assembly 1502.

It should be appreciated that the example roller shade installations illustrated and described herein, including the roller shade installation 800, the roller shade installation 900, the roller shade installation 1200, and the roller shade installation 1500 are not limited to including the illustrated impact-absorbing retention brackets. For example, one or more of the example roller shade installations 800, 900, 1200, and 1500 may be implemented with more or fewer retention brackets than illustrated and described, and may include any combination of retention brackets 200, 400, 600, 1000, or 1300.

The invention claimed is:

1. A roller shade system, comprising:

a first shade bracket;

a second shade bracket positionable with respect to the first shade bracket such that the first shade bracket and the second shade bracket define an axis of rotation therebetween;

a roller tube having a length "L" and an outside diameter "D" couplable to the first shade bracket and the second shade bracket along the axis of rotation defined by the first shade bracket and the second shade bracket, the roller tube including a shade material disposed about the roller tube; and a plurality of retention brackets disposable about the roller tube, each of the retention brackets spaced apart from the shade material disposed about the roller tube and positionable along at least a portion of the length of the roller tube, wherein each of the retention brackets consists of:

a single upper arm spaced apart from the roller tube, the upper arm having an edge that extends parallel to the axis of rotation; and a single lower arm spaced apart from the roller tube, the lower arm having an edge that extends parallel to the axis of rotation, the lower arm detachably couplable to the upper arm, such that, when coupled, the upper arm and the lower arm form a gap having a width "W" between the edge of the upper arm and the edge of the lower arm, the width "W" less than the outside diameter "D" of the roller tube.

2. The roller shade system of claim 1:

wherein the upper arm is formed integral with a mounting plate that includes a first plurality of apertures; and wherein the lower arm is formed integral with a base that includes a second plurality of apertures, each of the second plurality of apertures aligned with a respective one of the first plurality of apertures, each of the second plurality of apertures to accommodate passage of a fastener to engage a respective one of the first plurality of apertures.

3. The roller shade system of claim 2:

wherein the fastener includes a threaded fastener.

4. The roller shade system of claim 3:

wherein the edge of the upper arm that extends parallel to the axis of rotation comprises a thickness of the upper arm measured parallel to the axis of rotation; and wherein the edge of the lower arm that extends parallel to the axis of rotation comprises a thickness of the lower arm measured parallel to the axis of rotation.

5. The roller shade system of claim 4:

wherein the upper arm includes a flexible "U"-shaped member having a length "L2" that is less than one-half of the length "L1" of the roller tube; and wherein the lower arm includes a flexible "L"-shaped cover member.

6. The roller shade system of claim 2:

wherein the upper arm includes a first flexible arc-shaped member; and wherein the lower arm includes a second flexible arc-shaped member.

7. The roller shade system of claim 6:

wherein the upper arm mounting plate includes a rectangular-shaped mounting plate formed integral with the first flexible arc-shaped member, the rectangular-shaped mounting plate having the first plurality of apertures formed therethrough.

8. The roller shade system of claim 7 wherein the first flexible arc-shaped member is disposed at a 90° angle with respect to the rectangular-shaped mounting plate.

9. The roller shade system of claim 6:

wherein the upper arm mounting plate includes a rectangular-shaped mounting plate formed integral with the first flexible arc-shaped member, the rectangular-shaped mounting plate having the first plurality of apertures and a third plurality of apertures formed therethrough; and wherein the lower arm base further includes a rectangular-shaped base formed integral with the second flexible arc-shaped member, the rectangular-shaped base having the second plurality of apertures formed therethrough.

10. The roller shade system of claim 9:

wherein the first flexible arc-shaped member is disposed at a 90° angle with respect to the rectangular-shaped mounting plate; and wherein the second flexible arc-shaped member is disposed at a 90° angle with respect to the rectangular-shaped base.

11. The roller shade system of claim 1, further comprising:

a motor drive;

wherein the roller tube comprises a hollow roller tube member with the motor drive disposed at least partially within the hollow roller tube member.

12. The roller shade system of claim 11, further comprising:

an energy storage device electrically conductively coupled to the motor drive, the energy storage device disposed at least partially within the hollow roller tube member.

13. The roller shade system of claim 1 wherein the plurality of retention brackets are disposed symmetrically about a center point of the length "L" of the roller tube.

14. The roller shade system of claim 1 wherein the plurality of retention brackets are disposed asymmetrically about a center point of the length "L" of the roller tube.

* * * * *